United States Patent
Leserra

(10) Patent No.: US 12,304,108 B1
(45) Date of Patent: May 20, 2025

(54) HANDHELD HYDRAULIC-POWERED CONCRETE-CUTTING HANDSAW

(71) Applicant: Jeffrey Leserra, Fellsmere, FL (US)

(72) Inventor: Jeffrey Leserra, Fellsmere, FL (US)

( * ) Notice: Subject to any disclaimer, the term of this patent is extended or adjusted under 35 U.S.C. 154(b) by 0 days.

(21) Appl. No.: 18/199,956

(22) Filed: May 21, 2023

Related U.S. Application Data

(63) Continuation-in-part of application No. 16/847,338, filed on Apr. 13, 2020, now Pat. No. 11,654,597.

(60) Provisional application No. 62/834,510, filed on Apr. 16, 2019.

(51) Int. Cl.
| | | |
|---|---|---|
| B28D 1/00 | (2006.01) | |
| B23D 59/00 | (2006.01) | |
| B23D 59/02 | (2006.01) | |
| B23Q 11/08 | (2006.01) | |
| B25F 5/00 | (2006.01) | |
| B28D 1/04 | (2006.01) | |

(52) U.S. Cl.
CPC ............ B28D 1/045 (2013.01); B23D 59/001 (2013.01); B23D 59/02 (2013.01); B23Q 11/08 (2013.01); B25F 5/005 (2013.01)

(58) Field of Classification Search
CPC ................................................. Y10T 83/7793
See application file for complete search history.

(56) References Cited

U.S. PATENT DOCUMENTS

| | | | | |
|---|---|---|---|---|
| 5,038,474 A | * | 8/1991 | Larsson | B27B 5/14 125/11.22 |
| 6,442,841 B1 | * | 9/2002 | Nilsson | B23D 59/02 30/389 |
| 2010/0018514 A1 | * | 1/2010 | Wills | B23D 47/04 30/379.5 |
| 2014/0013909 A1 | * | 1/2014 | Carlsson | B28D 1/045 83/100 |
| 2014/0034349 A1 | * | 2/2014 | Kumar | F01C 13/02 173/221 |

* cited by examiner

*Primary Examiner* — Jacob A Smith
(74) *Attorney, Agent, or Firm* — John Rizvi; John Rizvi, P.A.—The Patent Professor®

(57) ABSTRACT

A handheld hydraulic-powered concrete-cutting handsaw is provided including a base. A blade guard may be provided on the base. A hydraulic blade motor may be provided on the blade guard. A sawblade may be drivingly engaged for rotation by the blade motor. A front handle and a rear handle may be removably attached to the blade guard and/or base. The handsaw can further include a removable slurry guard. A coolant manifold may be provided on the blade guard. A coolant flow control valve may be confluently connected to the coolant manifold. A coolant supply line may be confluently connected to the coolant flow control valve. A pair of coolant discharge lines may be confluently connected to the coolant manifold and discharge at opposite sides of the sawblade.

20 Claims, 13 Drawing Sheets

HANDHELD HYDRAULIC-POWERED CONCRETE-CUTTING HANDSAW

CROSS-REFERENCE TO RELATED APPLICATION

This application is a Continuation-in-Part of U.S. patent application Ser. No. 16/847,338, filed on Apr. 13, 2020, which claims the benefit of U.S. Provisional Patent Application No. 62/834,510, filed on Apr. 16, 2019, which are incorporated by reference herein in their entirety.

FIELD OF THE INVENTION

The present invention relates generally to saws, and more particularly, to a handheld hydraulic-powered concrete-cutting handsaw which is easy to handle and operate and suitable for cutting concrete floors, walls, window openings, door openings, subs, wall corners and the like and to flush cut walls from a floor surface.

BACKGROUND OF THE INVENTION

In the construction of concrete structures such as sidewalks, walkways, parking lots and the like, it may be necessary to cut seams, grooves or other cuts in the concrete to form expansion joints or channels or other openings to facilitate insertion of walls or other structures. Concrete saws are commonly used to form cuts in set concrete. A typical concrete saw may include a saw frame on which a trigger-operated motor is mounted. A circular sawblade having multiple cutting teeth in its edge may be drivingly engaged for rotation by the motor. Upon rotation of the sawblade by the motor, the cutting teeth contact and form the cut in the concrete.

One or more handles may be integrally formed with the saw frame to enable an operator to hold and guide the saw during the cutting operation. A slurry guard may also be integrally formed with the saw frame to receive slurry from the concrete in operations in which the saw is used to cut freshly-poured concrete. The handles and slurry guard are often damaged during use of the handsaw.

Concrete saws frequently utilize sawblades having diamond-impregnated cutting teeth. The cutting teeth may be attached to the sawblade using soldering or an adhesive material. During the cutting operation, the sawblade and blade hub may become heated to the point at which the solder joint or adhesive breaks, causing the cutting teeth to break from the sawblade. Moreover, stress fractures may form in the sawblade itself, potentially compromising its cutting efficiency. Thus, concrete saws may include a water-cooling system to cool the sawblade during operation of the saw.

Hand-operated saws provide several advantages over other types of sawblades. For example, hand-operated saws which utilize a circular sawblade may be capable of making deeper cuts than saws which are not hand-operated. Moreover, hand-operated saws typically offer an ergonomic advantage over saws which are not hand-operated. Thus, hand-operated saws may be easier to balance, handle, guide or manipulate than other types of saws.

One of the drawbacks of conventional concrete saws is that the handles and slurry guard on the saw frame may not be positioned for optimal balancing and ergonomic operation of the saw. Additionally, the handles may not be optimally positioned to enable an operator to easily pull the trigger to operate the sawblade motor.

Accordingly, there is an established need for a handheld hydraulic-powered concrete-cutting handsaw to handle and operate and suitable for cutting concrete floors, walls, window openings, door openings, subs, wall corners and the like and to flush cut walls from the floor surface, wherein the handsaw solves at least one of the aforementioned problems. For example, there remains a need for a handheld hydraulic-powered concrete-cutting handsaw which is easy to maintain or repair in the event of failure or damage of one or more of its components.

SUMMARY OF THE INVENTION

The present invention is directed to a handheld hydraulic-powered concrete-cutting handsaw which is easy to handle and operate and suitable for cutting concrete floors, walls, window openings, door openings, subs, wall corners and the like and to flush cut walls from the floor surface. The concrete-cutting handsaw may include a base. A blade guard may be provided on the base. A hydraulic blade motor may be mounted on the blade guard. A sawblade may be drivingly engaged for rotation by the blade motor. A hydraulic control valve having a valve plunger assembly may be confluently connected to the blade motor through a motor-actuating line. A hydraulic fluid supply line and a hydraulic fluid return line may be confluently connected to the hydraulic control valve and the blade motor, respectively. A bypass line may connect the hydraulic control valve to the hydraulic fluid return line. A rear handle may be removably mounted on the blade guard. A speed control valve trigger may be pivotally mounted on the rear handle. The speed control valve trigger may have a speed control trigger bearing which actuates the valve plunger assembly of the hydraulic control valve. A front handle may be removably mounted on the blade guard and/or the base. The rear handle and the front handle may be suitably placed and configured to optimize user comfort in pulling the speed control valve trigger on the hydraulic control valve. A coolant flow control valve may be confluently connected to a coolant supply line and a coolant manifold. A pair of coolant discharge lines may be confluently connected to the coolant manifold. The coolant flow control valve, the coolant supply line, the coolant manifold and the coolant discharge lines may be positioned at the upper portion of the blade guard to optimize the positions of these components and eliminate or minimize interference with operation of the handsaw. The hydraulic control valve may adjustably divide distribution of the hydraulic fluid between the motor-actuating line and the bypass line to vary the operational speed of the blade motor responsive to depression or manipulation of the speed control valve trigger.

In a first implementation of the invention, a handheld hydraulic-powered concrete-cutting handsaw comprises a base, a blade guard carried by the base, a hydraulic blade motor arranged above the base, and a sawblade drivingly engaged for rotation by the blade motor. A top portion of the sawblade is covered by the blade guard and a bottom portion of the sawblade protrudes downwardly form the blade guard and the base. The handsaw further includes a rear handle arranged above the base, and a front handle arranged forward of the blade motor and above the base. A hydraulic control valve is arranged above the base. The hydraulic control valve includes a valve plunger assembly having a valve plunger, and is configured to regulate a flow of hydraulic fluid to the blade motor responsively to movement of the valve plunger. The handsaw further includes a speed control valve trigger comprising a first trigger portion and a second trigger portion. The first trigger portion is arranged adjacent to the rear handle and is configured to enable manual operation of the first trigger portion by a hand grasping the rear handle. In turn, the second trigger portion is configured to adjustably compress the valve plunger responsively to manual operation of the first trigger portion.

In a second aspect, the second trigger portion may be configured to adjustably push against a free end of the valve plunger responsively to manual operation of the first trigger portion.

In another aspect, the second trigger portion may include a rotatable bearing configured to push against and roll on the free end of the valve plunger.

In another aspect, the valve plunger assembly may include a compression spring biasing the valve plunger to an extended position.

In yet another aspect, the compression spring may be configured to exert an expansion force on a free end of the valve plunger, and the second trigger portion may be configured to adjustably push against the free end of the valve plunger.

In another aspect, the speed control valve trigger may be rotatable relative to the rear handle about a trigger rotation axis responsively to a torque caused by manual operation of the first trigger portion.

In another aspect, the trigger rotation axis may be located adjacent and slightly offset of the valve plunger.

In another aspect, the second trigger portion may be configured to adjustably push against a top end of the valve plunger. The trigger rotation axis may be located above and slightly offset of a central longitudinal axis of the valve plunger.

In yet another aspect, the first trigger portion may be elongate in shape and arranged in a spaced-apart, generally parallel relationship with the rear handle.

In another aspect, the first trigger portion may be arranged below the rear handle.

In another aspect, the handsaw may further include a coolant manifold carried by the blade guard, a coolant flow control valve in fluid communication with the coolant manifold, a coolant supply line in fluid communication with the coolant flow control valve, and two coolant discharge lines in fluid communication with the coolant manifold and configured to discharge coolant fluid at opposite sides of the sawblade. The coolant flow control valve, the coolant manifold and the coolant discharge lines may be positioned at the upper portion of the blade guard.

In yet another aspect, the handsaw may further include a hydraulic fluid supply line configured to supply hydraulic fluid to the hydraulic control valve, a motor-actuating line providing hydraulic fluid communication between the hydraulic control valve and the blade motor, a hydraulic fluid return line configured to discharge hydraulic fluid from the blade motor, and a bypass line providing hydraulic fluid communication between the hydraulic control valve to the hydraulic fluid return line. The hydraulic control valve may be configured to adjustably divide distribution of hydraulic fluid between the motor-actuating line and the bypass line to vary an operational speed of the blade motor responsive to manual operation of the first trigger portion of the speed control valve trigger.

In another aspect, the handsaw may further include a slurry guard detachably attached to the base behind the blade motor.

In another aspect, the slurry guard may be attached to and extend rearward from a rear end of the base.

In another aspect, the rear handle may be removably carried by the blade guard.

In another aspect, the rear handle, hydraulic control valve and speed control valve trigger may be attached to one another forming a rear handle unit that is removably secured to the blade guard.

In another aspect, the rear handle unit may be selectively and removably securable in more than one position relative to the blade guard with a relative positioning of the rear handle, hydraulic control valve and speed control valve trigger remaining constant.

In yet another aspect, the front handle may be removably carried by the blade guard and/or the base.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
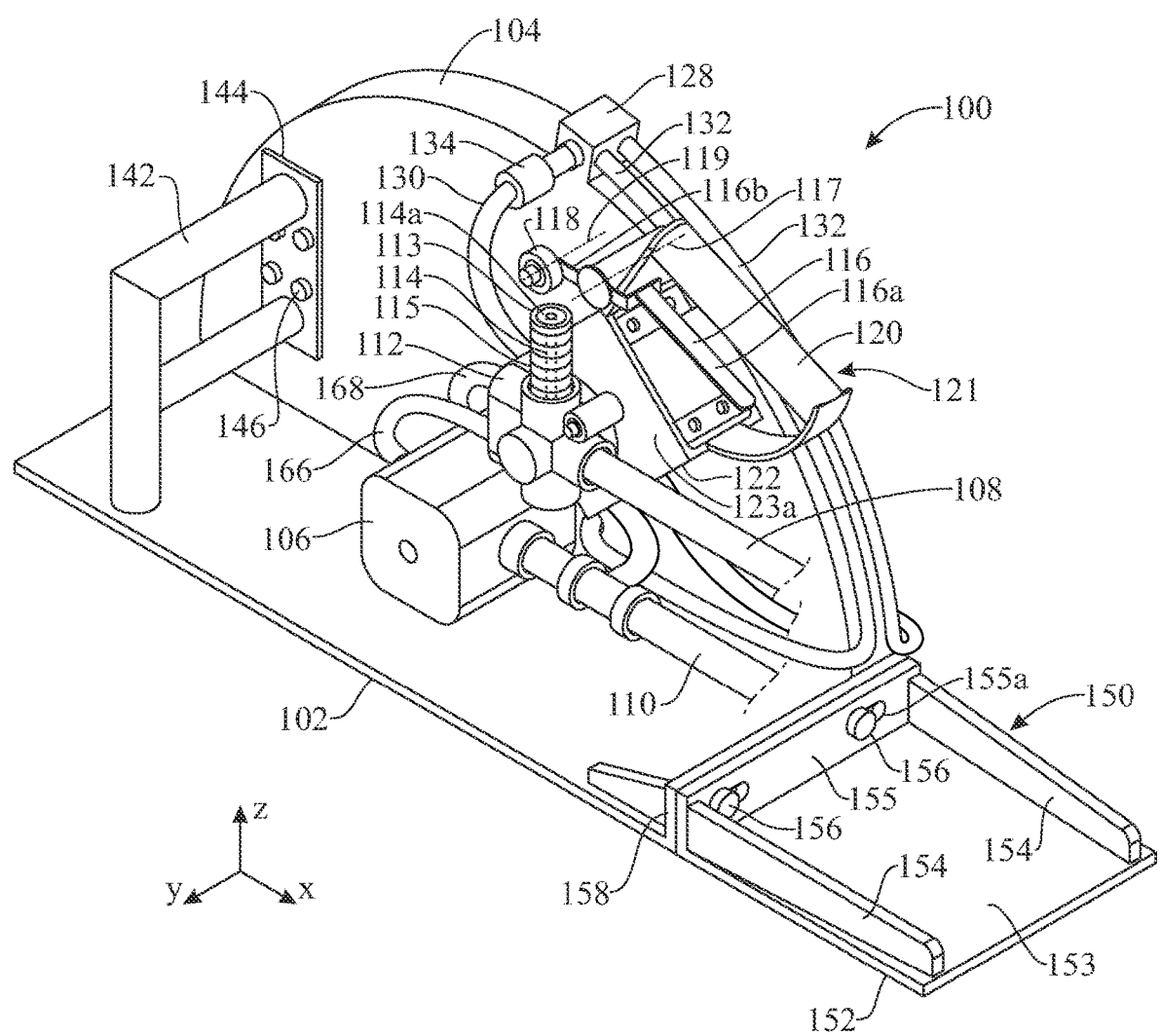
FIG. 1 presents a top rear isometric view showing a handheld hydraulic-powered concrete-cutting handsaw in accordance with a first illustrative embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a handheld hydraulic-powered concrete-cutting handsaw which is easy to handle and operate and suitable for cutting concrete floors, walls, window openings, door openings, subs, wall corners and the like and to flush cut walls from the floor surface.

Referring initially to FIGS. 1-4, an illustrative embodiment of the handheld hydraulic-powered concrete-cutting handsaw, hereinafter handsaw, is generally indicated by reference numeral 100. The handsaw 100 may include a base 102. In some embodiments, the base 102 may be elongated and rectangular, as illustrated. A blade guard 104 may be provided on the base 102, extending upward from the base 102, as shown. The blade guard 104 may be elongated and semicircular and may extend along a longitudinal side edge of the base 102, perpendicularly upward from the base 102. The longitudinal side edge is arranged along a front-to-rear, longitudinal direction x, which is generally perpendicular to a left-to-right, transverse direction y, and a vertical direction z, said three directions x, y, z forming a generally orthogonal axis set.

The handsaw 100 further includes a blade motor 106, which may be mounted on the blade guard 104 according to the knowledge of those skilled in the art. The blade motor 106 is hydraulic A hydraulic control valve 112 may be disposed in fluid communication with an inlet of the blade motor 106 through a motor-actuating line 166. At least one hydraulic fluid supply line 108 may be disposed in fluid communication with the hydraulic control valve 112. A hydraulic fluid pump and supply mechanism (not illustrated) may be disposed in fluid communication with the hydraulic fluid supply line 108, as is known by those skilled in the art. A hydraulic fluid return line 110 may be disposed in fluid communication with an outlet of the blade motor 106. The hydraulic fluid pump and supply mechanism may be disposed in fluid communication with the hydraulic fluid return line 110. A bypass line 168 may confluently connect the hydraulic control valve 112 to the hydraulic fluid return line 110. Accordingly, operation of the blade motor 106 may take place responsively to operation of the hydraulic fluid pump and supply mechanism as hydraulic fluid (not illustrated) typically flows through the hydraulic fluid supply line 108, the hydraulic control valve 112, the motor-actuating line 166, the blade motor 106 and the hydraulic fluid return line 110, respectively, and back to the hydraulic pump and supply mechanism.

The hydraulic control valve 112 may have a valve plunger assembly 113. The valve plunger assembly 113 can include a valve plunger 114 which may be deployable at different positions in the hydraulic control valve 112 to open the hydraulic control valve 112 to various degrees and facilitate corresponding flow rates or volumes of the hydraulic fluid through the hydraulic control valve 112 to the motor-actuating line 166 and the bypass line 168. A speed control valve trigger 116 is operable by a user to vary the speed of the handsaw 100. More specifically, depending on the position of the speed control valve trigger 116, the hydraulic control valve 112 may adjustably apportion or distribute the hydraulic fluid supplied via the hydraulic fluid supply line 108 between the motor-actuating line 166 and the bypass line 168 to operate the blade motor 106 at a corresponding adjustable speed. In some embodiments, the hydraulic control valve 112 may include a hydraulic pressure relief valve (not illustrated) to prevent excessive pressure of the hydraulic fluid flowing to the blade motor 106 which may otherwise cause damage to and/or failure of the blade motor 106. A compression spring 115 can operably engage the valve plunger 114 to bias the valve plunger 114 to an extended or non-compressed state in which the valve plunger 114 does not activate the hydraulic control valve 112 and thus hydraulic fluid flow from the hydraulic fluid supply line 108 to the motor-actuating line 166 is prevented, and the fluid is instead diverted to the bypass line 168. In the present embodiment, for instance and without limitation, the compression spring 115 is arranged radially outward and surrounding the valve plunger 114 and is configured to bias or push the valve plunger 114 outward (e.g., vertically upward) of the hydraulic control valve 112.

Figure 2:
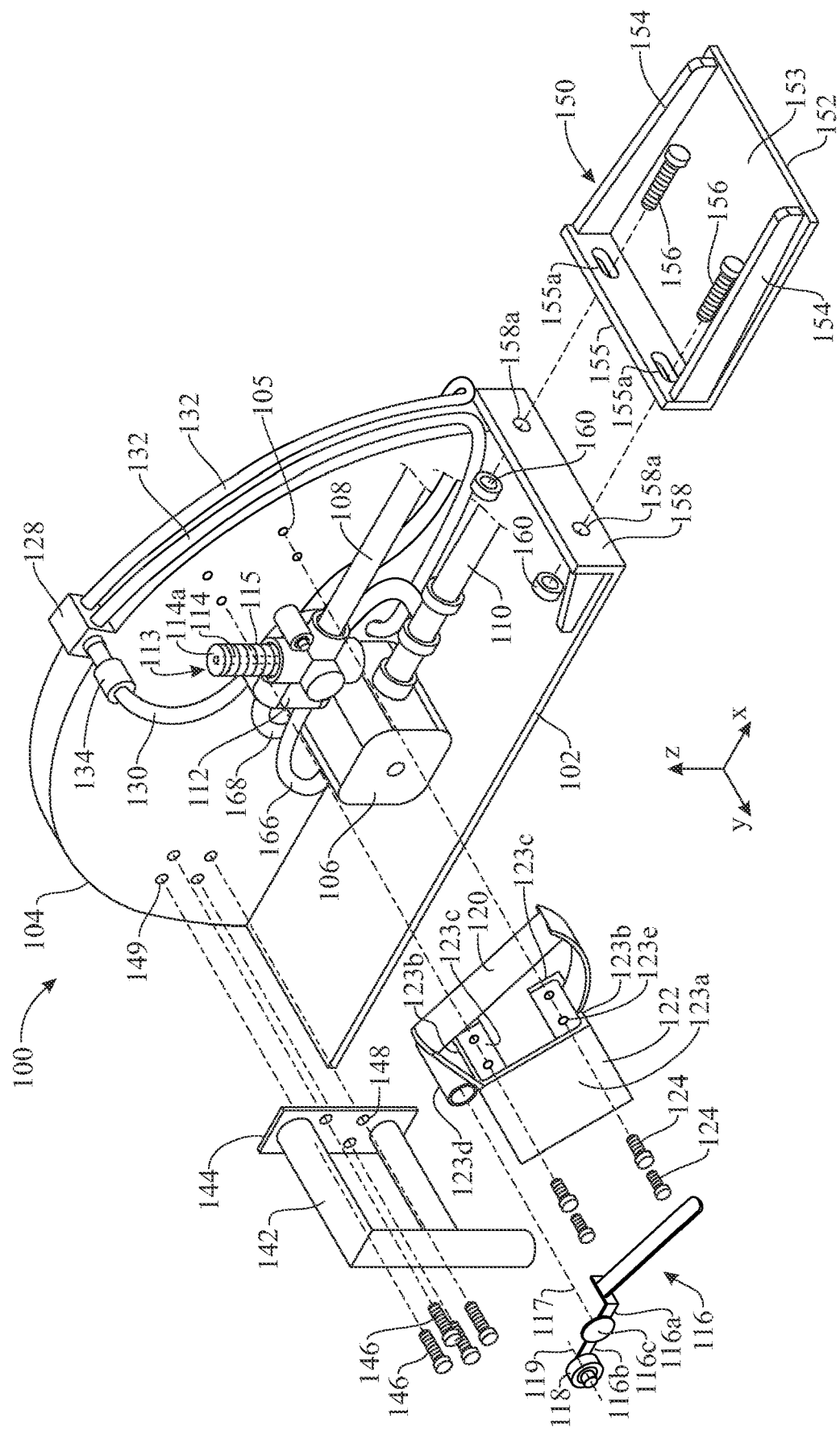
FIG. 2 presents an exploded top rear isometric view of the handheld hydraulic-powered concrete-cutting handsaw of FIG. 1.
Figure 3:
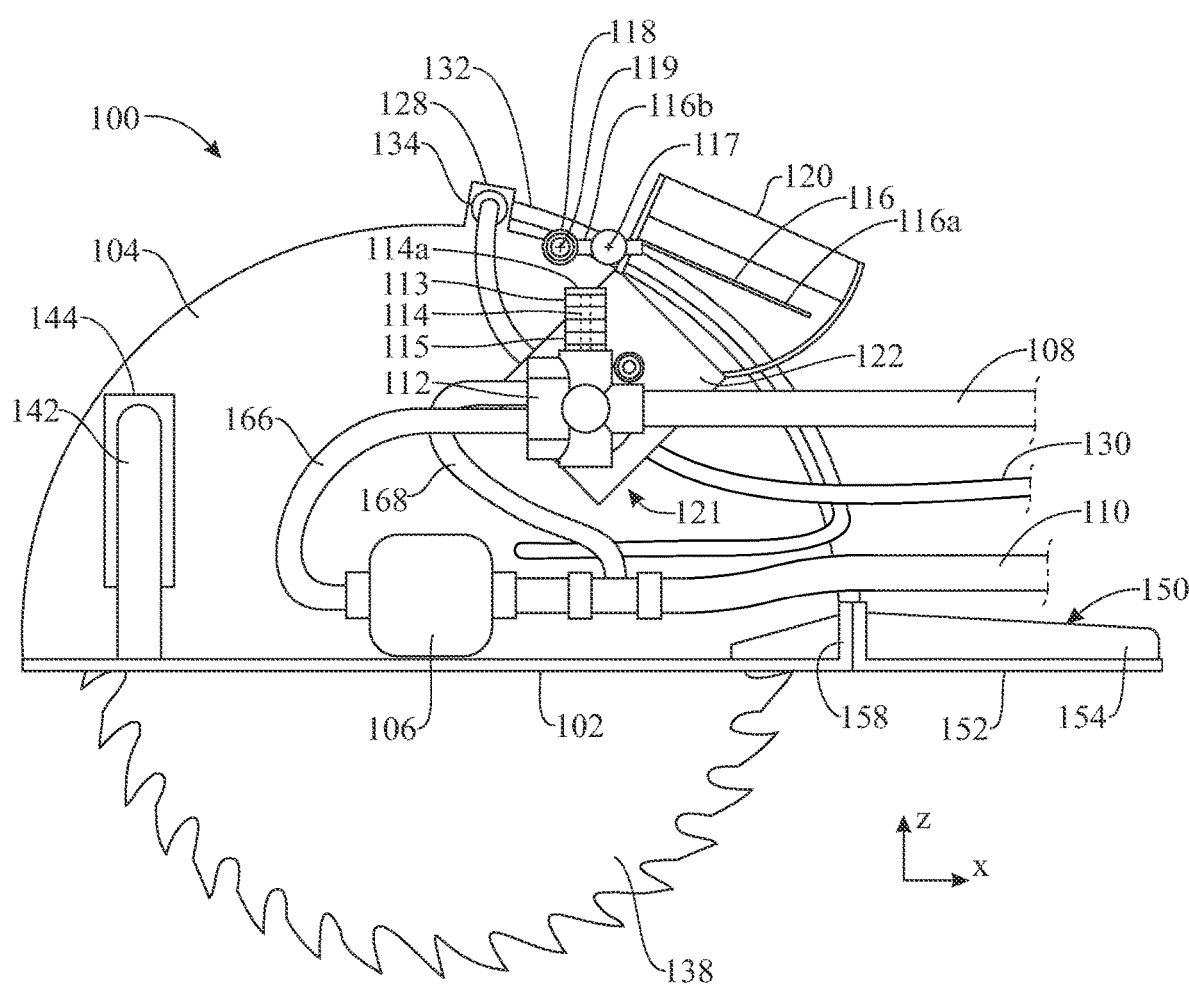
FIG. 3 presents a left side elevation view of the handheld hydraulic-powered concrete-cutting bandsaw of FIG. 1.
Figure 4:
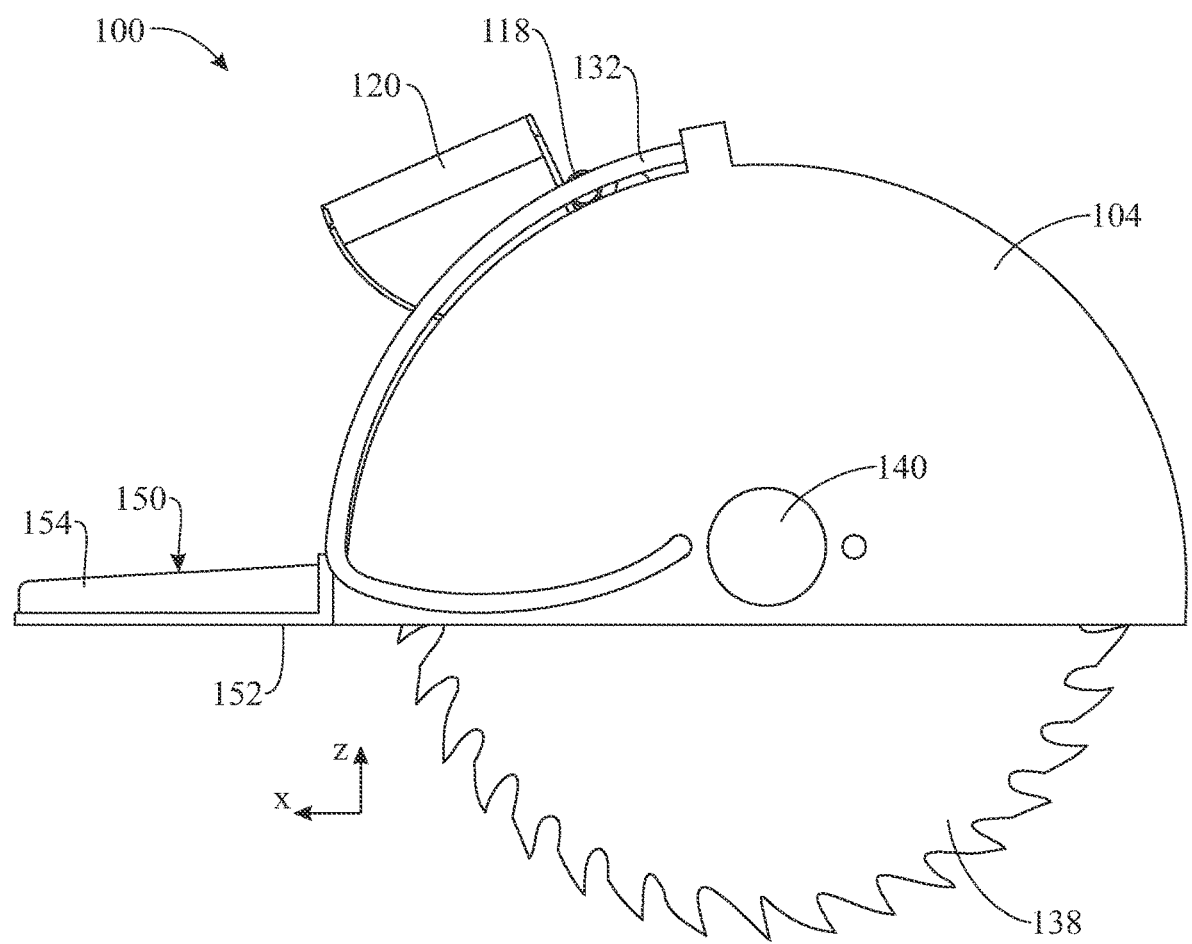
FIG. 4 presents a right side elevation view of the handheld hydraulic-powered concrete-cutting handsaw of FIG. 1.

As illustrated in FIGS. 3 and 4, a sawblade 138 may be drivingly engaged for rotation by the blade motor 106. In some embodiments, sawblade 138 may be a circular diamond-segmented sawblade known by those skilled in the art for the purpose of cutting concrete. As illustrated in FIG. 4, a blade hub 140 may mount the sawblade 138 on the blade motor 106. In some embodiments, the blade hub 140 may be made of stainless steel As illustrated in FIGS. 1 and 2, a first or rear handle 120 may be removably mounted on the blade guard 104. In some embodiments, a rear handle mount bracket 122 may mount the rear handle 120 on the blade guard 104. For instance, in the present embodiment, as best shown in FIG. 2, the rear handle mount bracket 122 includes a generally C-shaped body formed by a first, generally flat outer plate 123a, two transverse, parallel and spaced-apart connecting plates 123b extending from opposite front and rear edges of the outer plate 123a, and two opposing end plates 123c extending towards one another from the connecting plates 123b. The end plates 123c may be coplanar and configured to rest on a flat outer surface of the blade guard 104, as shown. A trigger connector 123d may be attached to the front L-shaped arm 123b for purposes that will be hereinafter described. As shown, bracket mount bolts 124 may be extended through respective bolt openings 123e in the end plates 123c of the rear handle mount bracket 122 and threaded or extended through corresponding registering bolt openings 105 in the blade guard 104. Securing nuts (not illustrated) may be threaded on the respective bracket mount bolts 124 and tightened in order to secure the end plates 123c, and thus the rear handle mount bracket 122, against the blade guard 104.

In some embodiments, such as the present embodiment, the hydraulic control valve 112 is carried by the rear handle 120, such as by having the hydraulic control valve 112 attached or mounted to the rear handle mount bracket 122, as best shown in FIG. 1. More specifically, in the present embodiment, the outer plate 123a serves as a mounting area for the hydraulic control valve 112; for instance and without limitation, the hydraulic control valve 112 may be adhered, welded or otherwise attached to the outer plate 123a. As best shown in FIG. 3, the rear handle 120 may be positioned above and to the rear of the hydraulic control valve 112. Alternatively or additionally, the speed control valve trigger 116 may be carried by or affixed to the rear handle 120. For example, in the present embodiment, the speed control valve trigger 116 is mounted to the trigger connector 123d, which is in turn attached to the rear handle mount bracket 122, such as by welding or other well-known methods of attaching or integrally-forming metallic or plastic parts. In some embodiments, the rear handle 120 may be selectively mounted in different positions within the handsaw 100, i.e. relative to the base 102 and blade guard 104. For instance, the blade guard 104 may include additional bolt openings 105 to the ones depicted herein, to allow a user to select to which subset of bolt openings 105 the rear handle 120 is attached. Alternatively or additionally, the bolt openings 123e and/or bolt openings 105 may be formed as elongated holes or slots which allow sliding and repositioning of the rear handle 120 relative to the blade guard 104 prior to tightening the bracket mount bolts 124 and corresponding nuts. In particularly advantageous embodiments, such as the present embodiment, the rear handle 120 carries both the hydraulic control valve 112 and the speed control valve trigger 116 (e g., via the rear handle mount bracket 122) such that the rear handle 120, hydraulic control valve 112 and speed control valve trigger 116 form a rear handle assembly 121 or unit that is jointly repositionable to different positions along the blade guard 104. In being a unit, the relative positioning of all three elements (rear handle 120, hydraulic control valve 112 and speed control valve trigger 116) is maintained, regardless of where on the blade guard 104 the rear handle assembly 121 is specifically and selectively attached. Such repositioning is further facilitated by having the fluid lines described herein that are connected to the hydraulic control valve 112 (i.e. hydraulic fluid supply line 108, motor-actuating line 166 and bypass line 168) formed of one or more flexible materials, or otherwise flexible.

As described heretofore, the hydraulic control valve 112 may control the flow of hydraulic fluid through the blade motor 106 by adjustably diving the fluid fed through the fluid supply line 108 into a first flow directed to the blade motor 106 via the motor-actuating line 166 and a second flow directed to the hydraulic fluid return line 110 via the bypass line 168. As further illustrated in FIGS. 1 and 2, in order to facilitate convenient user-operation of the hydraulic control valve 112, the speed control valve trigger 116 may be pivotally mounted on the rear handle mount bracket 122, and preferably below the rear handle 120, as shown, such as generally or approximately parallel to and spaced apart from the rear handle 120. The speed control valve trigger 116 is rotatable about a trigger rotation axis 117, located above the hydraulic control valve 112, as best shown in FIG. 3. As best shown in FIG. 2, the speed control valve trigger 116 may include a first trigger portion 116a and a second trigger portion 116b extending from opposite sides of an intermediate portion 116c, wherein the portions 116a, 116b and 116c may form a single-piece unit or a unit that is jointly rotatable about the trigger rotation axis 117. More specifically, the intermediate portion 116c may be rotatably connected to the trigger connector 123d of the rear handle mount bracket 122, such as by a shaft (not shown), thereby defining the trigger rotation axis 117.

A speed control trigger bearing 118 can be rotatably attached to or carried by the second trigger portion 116b and can be configured to rotate relative to the second trigger portion 116b about a bearing rotation axis 119 which can be parallel to the trigger rotation axis 117. The speed control valve trigger 116 may operably engage the valve plunger assembly 113 to open and close the hydraulic control valve 112 responsive to actuation of the speed control valve trigger 116; more specifically, in the present embodiment, the speed control trigger bearing 118 is configured to roll upon and axially push on an outer end of the valve plunger assembly 113 (e.g., a smooth top spring-retaining end 114a of the valve plunger assembly 113) when the user operates the first trigger portion 116a and the first and second trigger portions 116a, 116b consequently rotate jointly about the trigger rotation axis 117, said axial pushing of the speed control trigger bearing 118 causing the valve plunger 114 to advance into the hydraulic control valve 112 (enabling/increasing hydraulic fluid flow) and the compression spring 115 to compress. Accordingly, finger actuation of the speed control valve trigger 116 facilitates variable positioning of the valve plunger assembly 113 in the hydraulic control valve 112 and corresponding variable flow rates of the hydraulic fluid through the hydraulic control valve 112 to the blade motor 106, and hence, variable rotational speeds of the sawblade 138. As best shown in FIG. 2, the first trigger portion 116a being arranged beneath, spaced-apart from, and generally parallel to the rear handle 120 facilitates the user grasping the rear handle 120 from above and operating the first trigger portion 116a by pulling upward on the first trigger portion 116a with one or more fingers. Upward pulling of the first trigger portion 116a towards the rear handle 120 causes a downward rotation of the second trigger portion 116b and speed control trigger bearing 118 towards, and adjustably onto, the valve plunger 114, to operate the hydraulic control valve 112. Having the trigger rotation axis 117 above the valve plunger 114, and in near vertical alignment (i.e. only slightly offset) with a central vertical axis of the valve plunger 114, as shown, allows to minimize the size of the second trigger portion 116b, contributing to reduce the overall weight and increase compactness of the handsaw 100. The rear handle 120 and first trigger portion 116a being in turn positioned generally immediately rearward of the trigger rotation axis 117 further contributes to minimize size and weight of the speed control valve trigger 116 and thus of the handsaw 100.

At least one coolant discharge line 132 may be positioned adjacent to at least one of the side surfaces of the sawblade 138. In some embodiments, such as the present embodiment, a pair of coolant discharge lines 132 may be positioned adjacent to the respective opposite side surfaces of the sawblade 138, as illustrated. A coolant manifold 128 may be mounted on the blade guard 104 at a fixed position, as shown, or adjustable positions. The coolant manifold 128 may be disposed in fluid communication with a coolant fluid pump and supply mechanism (not illustrated) through a coolant supply line 130. A coolant flow control valve 134 may be provided in the coolant supply line 130. The coolant discharge lines 132 may be disposed in fluid communication with the coolant manifold 128. The coolant discharge lines 132 may extend initially along the upper surface of the blade guard 104 and then through respective openings (not illustrated) in the opposite sides of the blade guard 104, discharging adjacent to the respective side surfaces of the sawblade 138. In operation of the handsaw 100, responsive to operation of the coolant fluid pump and supply mechanism, coolant fluid (not illustrated) may flow through the coolant supply line 130, the coolant flow control valve 134, and the coolant manifold 128, and then through the respective coolant discharge lines 132, and may be discharged from the respective coolant discharge lines 132 against the respective side surfaces of the sawblade 138 to cool the sawblade 138.

In some embodiments, the coolant manifold 128, coolant supply line 130, coolant discharge lines 132 and coolant flow control valve 134 may be positioned at the upper portion of the blade guard 104, as illustrated, to optimize the positions of these components and eliminate or minimize interference during operation of the handsaw 100.

As shown in FIG. 1, a second or front handle 142 may be removably mounted on at least one of the base 102 and the blade guard 104 in front of the blade motor 106. As illustrated in FIGS. 1 and 2, in some embodiments, a front handle mount bracket 144 may mount the front handle 142 to the blade guard 104. As illustrated in FIG. 2, multiple bracket mount bolts 146 may be extended through respective bolt openings 148 in the front handle mount bracket 144 and extended or threaded through corresponding registering bolt openings 149 in the blade guard 104. Securing nuts (not illustrated) may be threaded on the respective bracket mount bolts 146 and tightened against the blade guard 104. Accordingly, the rear handle 120 and the front handle 142 may enable an operator (not illustrated) to easily guide and manipulate the handsaw 100 during cutting operations. In some embodiments, the front handle 142 may be selectively mounted in different positions within the handsaw 100, i.e. relative to the base 102 and blade guard 104. For instance, the blade guard 104 may include additional bolt openings 149 to the ones depicted herein, to allow a user to select to which subset of bolt openings 149 the front handle 142 is attached. Alternatively or additionally, the bolt openings 148 and/or bolt openings 149 may be formed as elongated holes or slots which allow sliding and repositioning of the front handle 142 relative to the blade guard 104 prior to tightening the bracket mount bolts 146 and corresponding nuts.

With continued reference to FIG. 1, a slurry guard 150 may be provided on the base 102, typically on a rear end of the handsaw 100 behind the blade motor 106 and longitudinally opposite to the front handle 142. In some embodiments, the slurry guard 150 may be removably mounted on the base 102 to allow for rapid and convenient disassembly of the slurry guard 150 when required such as for maintenance or replacement purposes. The slurry guard 150 may include a slurry guard bracket 152. The slurry guard bracket 152 may have a bottom, slurry guard protecting wall 153, which may be planar (as shown) or present alternative shapes, a pair of elongated, parallel, spaced-apart slurry guard sidewalls 154 extending upward from the slurry guard protecting wall 153, and a transverse mounting wall 155 extending between the slurry guard sidewalls 154 and the slurry guard protecting wall 153 at a front end of the slurry guard bracket 152. A slurry guard mount flange 158 may be provided on the base 102. As illustrated in FIGS. 1 and 2, a pair of slurry guard mount bolts 156 may be extended through registering pairs of bolt openings 155a, 158a in the transverse mounting wall 155 of the slurry guard bracket 152 and the slurry guard mount flange 158, respectively, and securing nuts 160 threaded on the respective slurry guard mount bolts 156 to detachably mount the slurry guard 150 on the base 102. In some embodiments, one or both of the bolt openings 155a and 158a may be transversely elongated or slot-shaped to allow for relative transverse adjustment between the slurry guard 150 and the base 102; for instance, in the present embodiment, as best shown in FIG. 2, the bolt openings 155a of the transverse mounting wall 155 of the slurry guard bracket 152 are elongated or slot-shaped while the bolt openings 158a in the slurry guard mount flange 158 are round.

Figure 5:
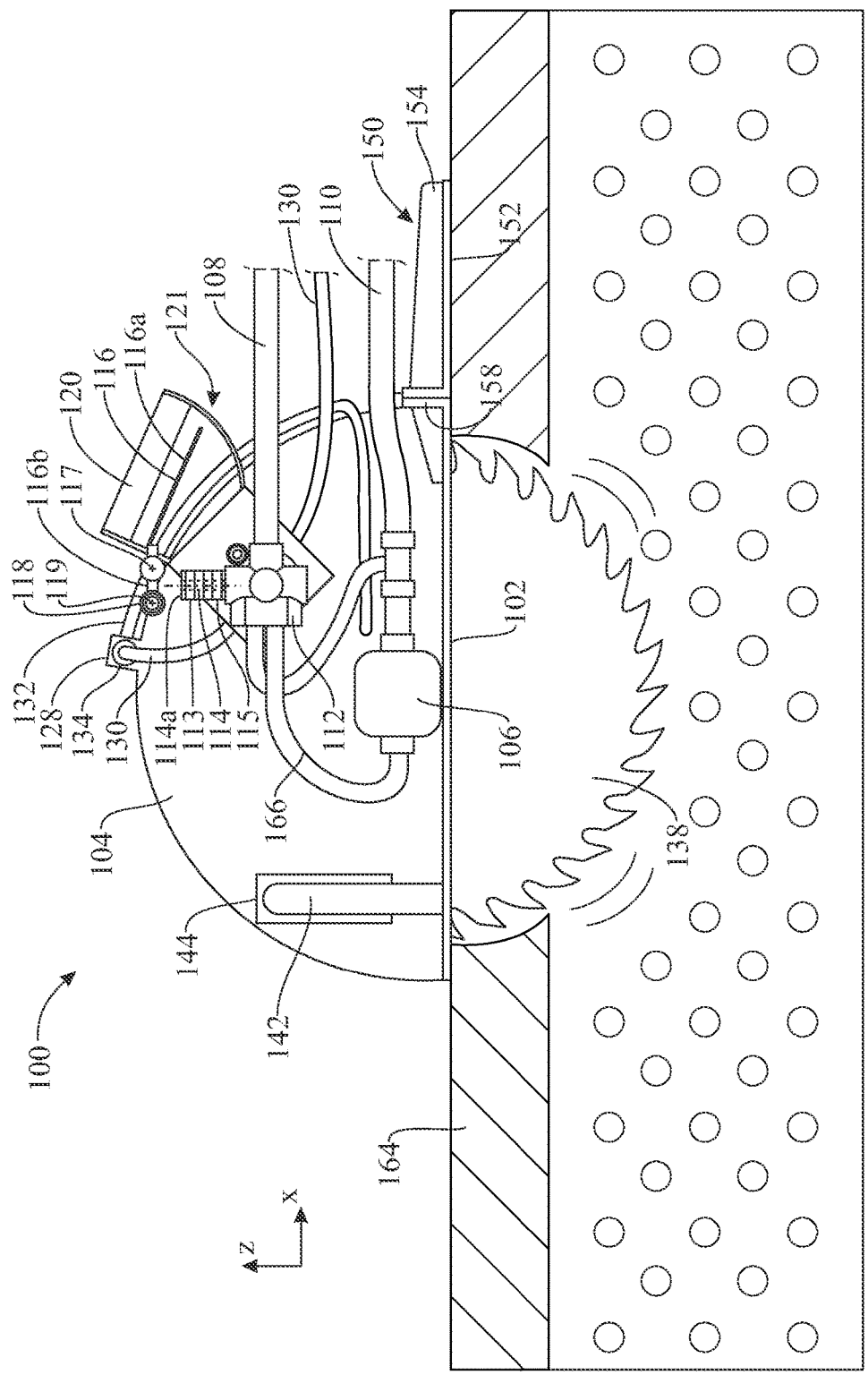
FIG. 5 presents a left side elevation view of the handheld hydraulic-powered concrete-cutting handsaw of FIG. 1, cutting a workpiece in typical operation of the bandsaw.

Referring next to FIG. 5, in typical application, the handsaw 100 may be operated to cut a concrete workpiece 164 in the construction of concrete structures such as such as sidewalks, walkways, parking lots and the like. Accordingly, the hydraulic fluid pump and supply mechanism (not illustrated) may be connected to the hydraulic fluid supply line 108 and the hydraulic fluid return line 110. The coolant fluid pump and supply mechanism (not illustrated) may be connected to the coolant manifold 128 through the coolant supply line 130.

An operator (not illustrated) of the handsaw 100 may grip the rear handle 120 with a rear hand and the front handle 142 with the other, front hand. As he or she actuates the speed control valve trigger 116 with a finger on the rear hand, hydraulic fluid may flow from the hydraulic fluid pump and supply mechanism (not illustrated) through the hydraulic fluid supply line 108, hydraulic control valve 112, motor-actuating line 166, bypass line 168, blade motor 106, hydraulic fluid return line 110 and back to the hydraulic fluid pump and supply mechanism. Accordingly, the blade motor 106 may rotate the sawblade 138 as the sawblade 138 cuts the workpiece 164. The operator may vary the operational speed of the blade motor 106 and rotational speed of the sawblade 138 by correspondingly varying the position of the speed control valve trigger 116 using his or her finger(s) as the speed control valve trigger 116 varies the position of the valve plunger assembly 113 in the hydraulic control valve 112 and the hydraulic control valve 112 apportions or distributes the hydraulic fluid between the motor-actuating line 166 and the bypass line 168. It will be appreciated by those skilled in the art that, due to the smooth top spring-retaining end 114a, the speed control trigger bearing 118 may roll smoothly and easily along the valve plunger assembly 113. This expedient may impart case in pulling the speed control valve trigger 116 and smooth progression in controlling the operational speed of the blade motor 106.

As it rotates in the blade guard 104 and cuts the workpiece 164, the sawblade 138 may heat considerably due to friction. Accordingly, the coolant fluid pump and supply mechanism (not illustrated) may pump coolant fluid through the coolant supply line 130, the coolant flow control valve 134, the coolant manifold 128 and the coolant discharge lines 132, respectively, and discharged against the respective side surfaces of the sawblade 138 to cool the sawblade 138. It will be appreciated by those skilled in the art that the coolant manifold 128, coolant supply line 130, coolant discharge lines 132 and coolant flow control valve 134 may be positioned at the upper portion of the blade guard 104, as illustrated, to eliminate or minimize interference with operation of the handsaw 100 and to more effectively manage the supply of coolant fluid for the sawblade 138.

During operation of the handsaw 100, the slurry guard 150 may engage and be dragged along the concrete workpiece 164 to function as a heel and steady the handsaw 100 during operation. In the event that it becomes damaged or wears out, the slurry guard 150 may be replaced typically by removing the slurry guard mount bolts 156, removing the worn slurry guard 150 from the base 102 and fastening a replacement slurry guard 150 to the base 102 typically using the slurry guard mount bolts 156.

It will be appreciated by those skilled in the art that the rear handle 120 and/or the front handle 142 may be selectively and individually replaced, as necessary, in the case of excessive wearing or damage without having to replace the entire handsaw 100. Accordingly, the rear handle 120 may be replaced typically by unthreading the bracket mount bolts 124 (FIG. 2) from the rear handle mount bracket 122, disengaging the rear handle mount bracket 122 with the old rear handle 120 from the blade motor 106, and fastening the rear handle mount bracket 122 of a replacement rear handle 120 to the blade motor 106 typically using the bracket mount bolts 124. The front handle 142 may be replaced typically by unthreading the bracket mount bolts 146 from the front handle mount bracket 144, disengaging the front handle mount bracket 144 of the old front handle 142 from the blade guard 104, and fastening the front handle mount bracket 144 of a replacement front handle 142 to the blade guard 104 typically using the bracket mount bolts 146.

Figure 7:
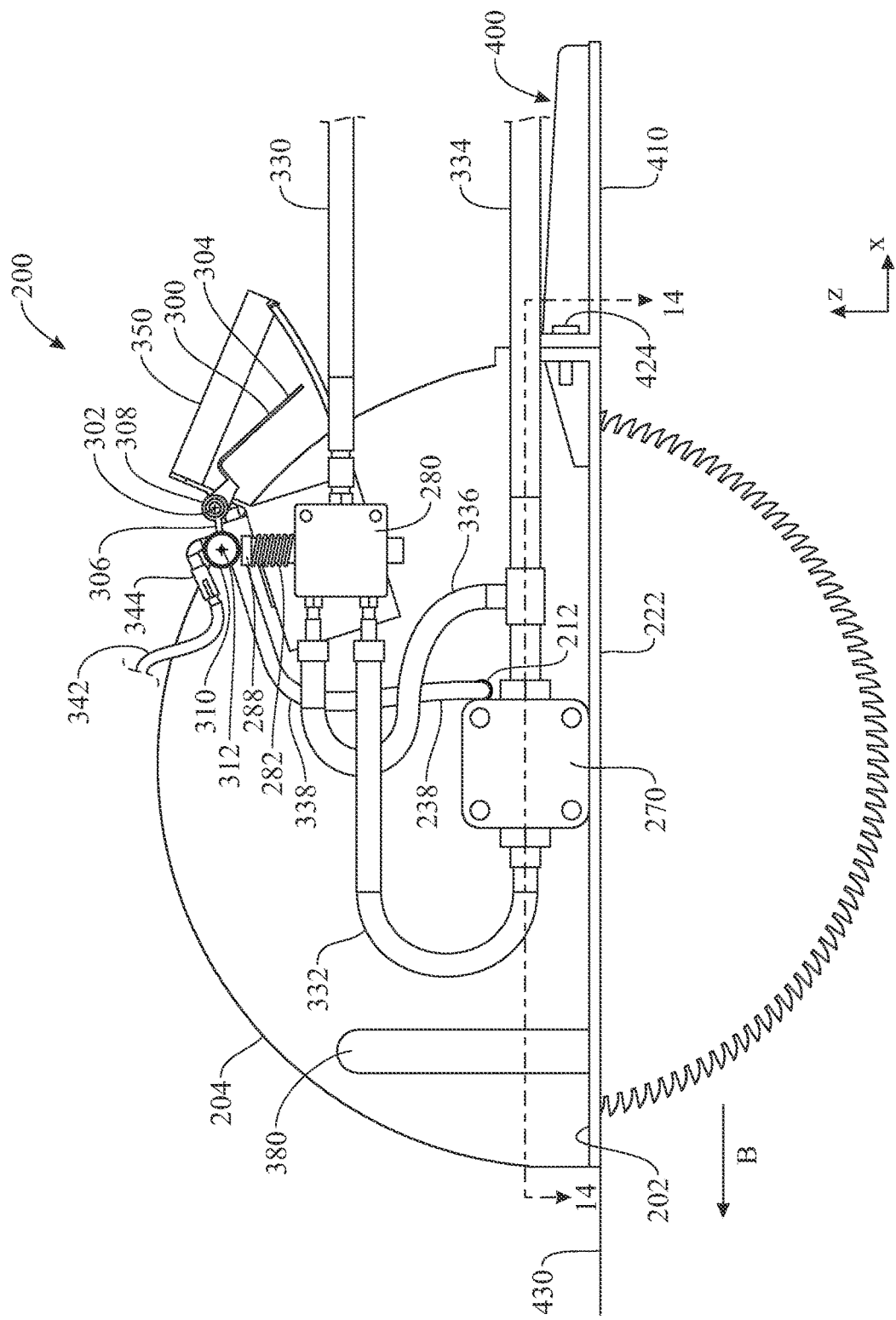
FIG. 7 presents a left side elevation view of the handsaw of FIG. 6, further illustrating fluid tubings comprised in the handsaw.
Figure 8:
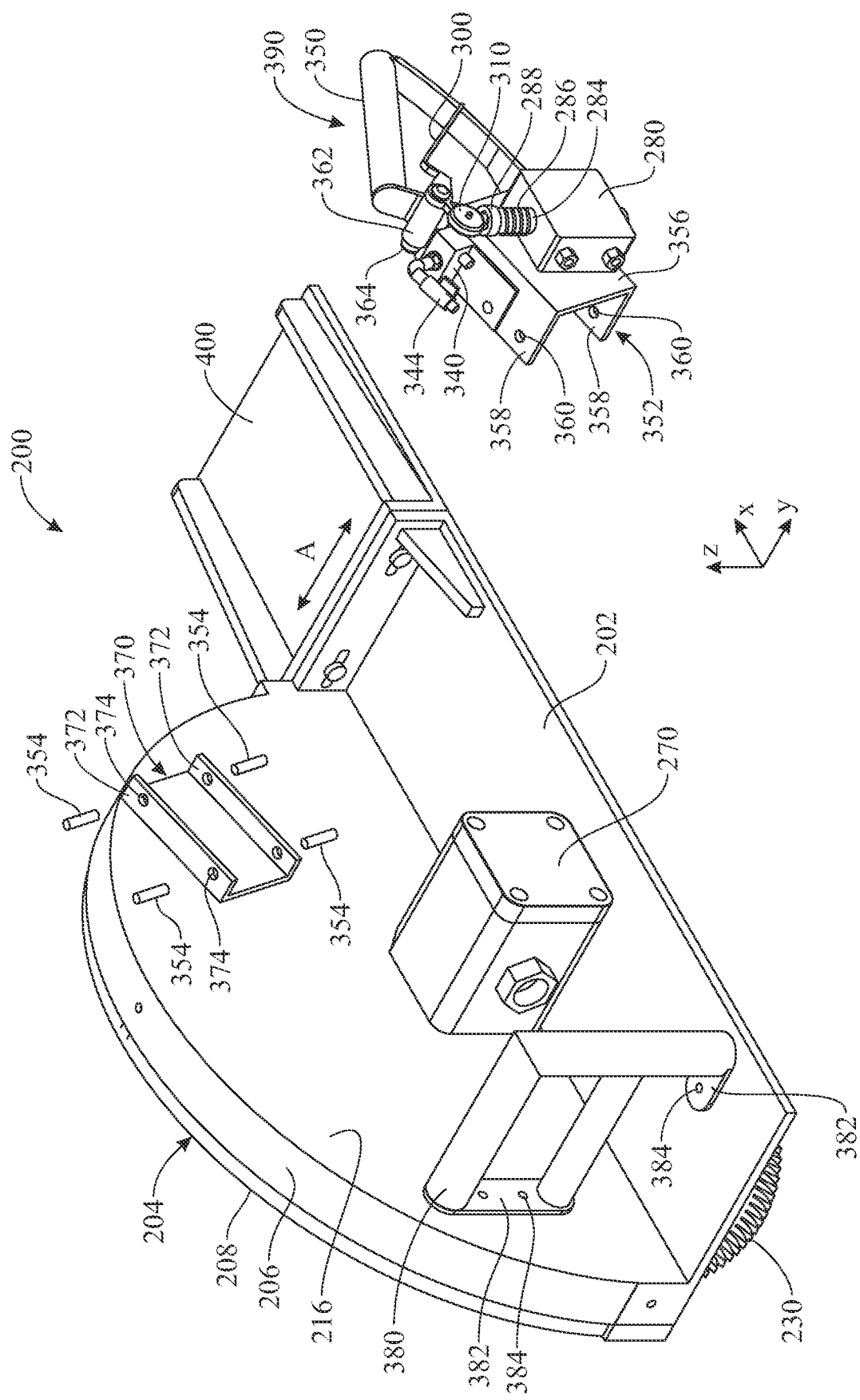
FIG. 8 presents a top front isometric view of the handsaw of FIG. 1, showing a rear handle assembly detached from the blade guard, the rear handle assembly carrying a rear handle, a coolant fixture or manifold, a speed control valve trigger, and a hydraulic control valve.
Figure 9:
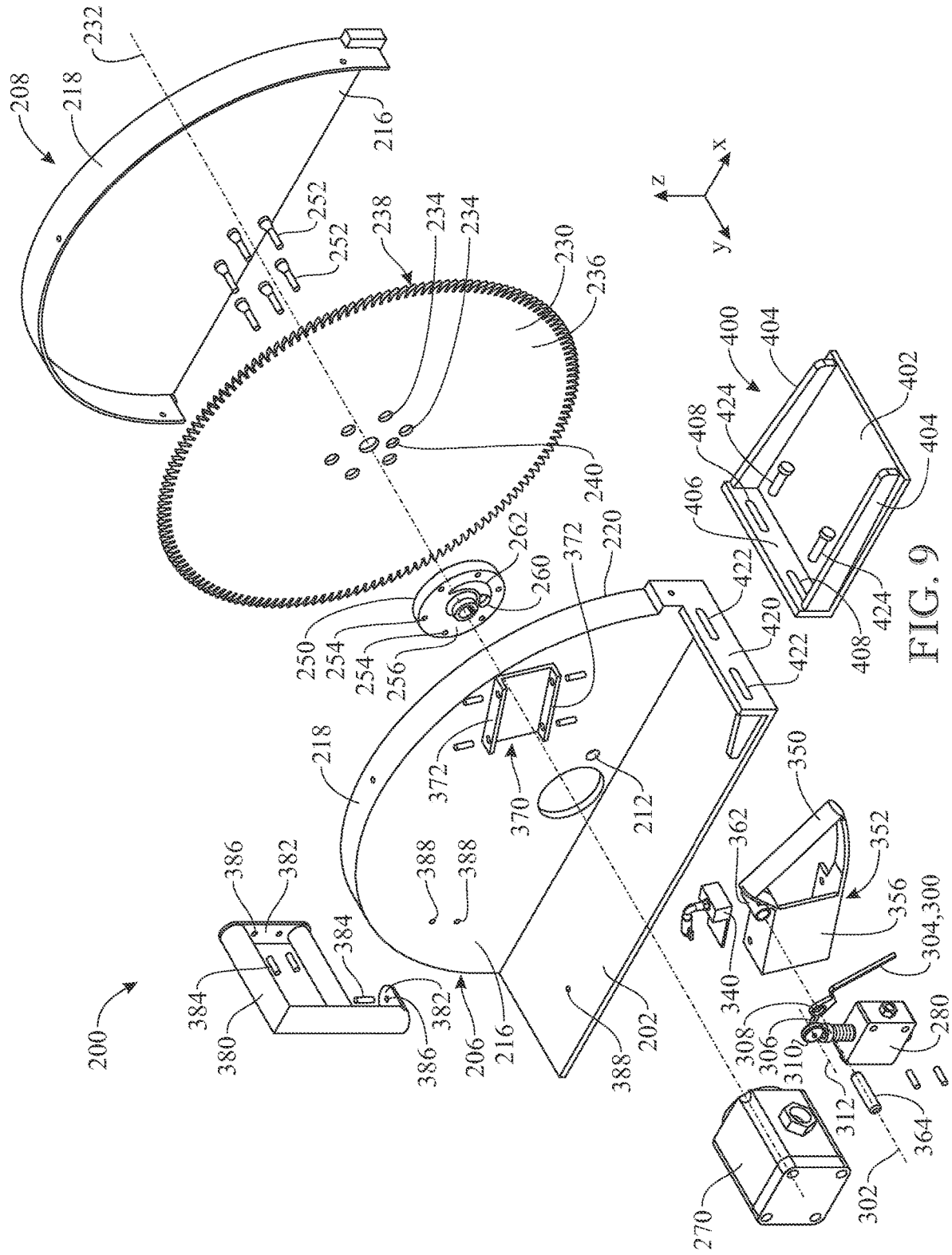
FIG. 9 presents an exploded, top rear, left side isometric view of the handsaw of FIG. 6.
Figure 10:
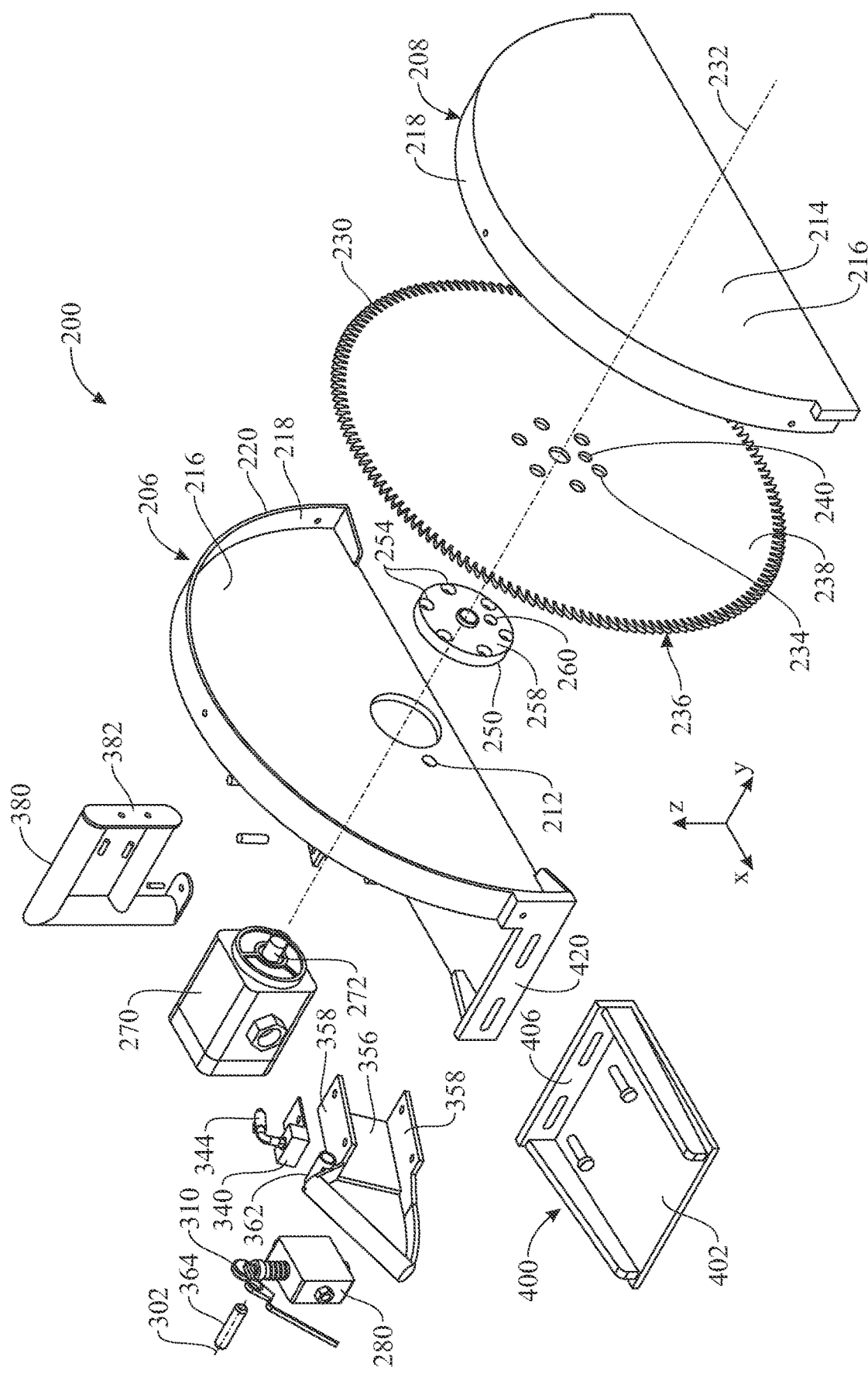
FIG. 10 presents an exploded, top rear, right side isometric view of the handsaw of FIG. 6.

The illustrations of FIGS. 6-14 show a handsaw 200 in accordance with another illustrative embodiment of the present invention. The handsaw 200 includes a base 202, which may be generally flat and horizontally formed along a longitudinal direction x and a transverse direction y, similarly to the base 102 of the previous embodiment. As with the previous embodiment, a blade guard 204 may be provided on and extend upward from the base 202, such as along a longitudinal side edge of the base 202, in a preferably vertical direction z. In some embodiments, as shown in FIGS. 9 and 10, the blade guard 204 may be comprised of a first blade guard portion 206 and a second blade guard portion 208. The first and second blade guard portions 206 and 208 may be preferably disconnectably secured to one another. When secured to one another, the first and second blade guard portions 206 and 208 may define an interior space 210 therebetween, the interior space 210 configured to receive a portion of a sawblade 230, which may a circular diamond-segmented sawblade for the purpose of cutting concrete, for instance and without limitation. As will be described in greater detail hereinafter, the sawblade 230 is rotatable about a blade rotation axis 232, which is perpendicular to the sawblade 230 and extends generally along the transverse direction y.

In some embodiments, such as the present embodiment, each one of the first and second blade guard portions 206 and 208 may include a respective cover panel 216 and a respective rim 218. The cover panel 216 may be arranged generally perpendicular to the blade rotation axis 232, and may be semicircular, as shown, for instance and without limitation. The rim 218 may extend generally perpendicular to the cover panel 216. When the first and second blade guard portions 206 and 208 are attached to one another, as shown for instance in FIGS. 6 and 14, the cover panels 216 of the first and second blade guard portions 206 and 208 may be arranged in spaced-apart and parallel relationship with one another, and the rims 218 of the first and second blade guard portions 206 and 208 may be secured to one another such as in an overlapping configuration, such that the cover panels 216 and rims 218 define the interior space 210 of the blade guard 204.

In some embodiments, the base 202 may be attached to one of the first and second blade guard portions 206 and 208. For example, in the present embodiment, the base 202 is attached to and extends generally perpendicular to the first blade guard portion 206, oppositely to the second blade guard portion 208. In some embodiments, such as the present embodiment, the second blade guard portion 208 may be disconnectably secured to the first blade guard portion 206, and the handsaw 200 may be selectively usable with the second blade guard portion 208 disconnected from, or connected to, the first blade guard portion 206. In a first mode of operation, in which the second blade guard portion 208 is mounted to the first blade guard portion 206, as shown for instance in FIGS. 6 and 14, the sawblade 230 may be partially received within the interior space 210 defined between the first and second blade guard portions 206 and 208 as described heretofore. In a second configuration, in which the second blade guard portion 208 is disassembled from the first blade guard portion 206, the sawblade 230 may lie generally flush with an outer edge 220 of the rim 218 of the first blade guard portion 206, allowing for a flush-cut operation of the handsaw 200.

Also similarly to the previous embodiment, the handsaw 200 may further include a blade hub 250 and a hydraulic blade motor 270, which is operatively connected to the sawblade 230 via a blade hub 250. The blade hub 250 is non-rotationally attached to a motor shaft 272 such that the blade hub 250 is driven for rotation about the blade rotation axis 232 by the motor shaft 272, and is jointly rotatable with the motor shaft 272. In turn, the sawblade 230 is non-rotationally secured to the blade hub 250 such that the sawblade 230 is driven for rotation about the blade rotation axis 232 by the blade hub 250, and thus by the motor shaft 272, and is jointly rotatable with the blade hub 250 and the motor shaft 272. The sawblade 230 may be connected to the blade hub 250 by a plurality of fasteners 252, which may extend through respective openings 234 formed in the sawblade 230 and corresponding openings 254 formed in the blade hub 250, as shown for instance in FIG. 14. The sawblade 230 may include a first side 236 (FIG. 9) and an opposite, second side 238. The first and second sides 236 and 238 face the first and second blade guard portions 206 and 208, respectively. At least one through opening 240 may be formed in the sawblade 230, providing fluid communication from the first side 236 to the second side 238 through the sawblade 230. For example, the present embodiment includes a single through opening 240. In some embodiments, such as the present embodiment, the at least one through opening 240 may be arranged radially offset from the blade rotation axis 232. In some embodiments, the at least one through opening 240 may be arranged radially inward of the fastener openings 234 with respect to the blade rotation axis 232, as shown for instance in FIG. 9.

The blade motor 270 is configured to drive the sawblade 230 for rotation about the blade rotation axis 232. The blade motor 270 may be carried by, or mounted to, the blade guard 204. A hydraulic control valve 280 is disposed in fluid communication with an inlet of the blade motor 270 and is configured to selectively supply a hydraulic fluid to the blade motor 270 responsively to manual operation of a speed control valve trigger 300 by a user. Similarly to the previous embodiment, the handsaw 200 may include several hydraulic fluid tubings, wherein each tubing may be formed of one or more lines, generally referred to in singular form (i.e., "line") for simplicity. Specifically, as shown in FIG. 7, the hydraulic fluid tubings may include: a hydraulic fluid supply line 330 providing hydraulic fluid from a hydraulic fluid pump and supply mechanism (not shown) to the hydraulic control valve 280; a motor-actuating line 332 providing hydraulic fluid communication from the hydraulic control valve 280 to a fluid inlet of the blade motor 270; a hydraulic fluid return line 334 providing fluid communication from a fluid outlet of the blade motor 270 to the hydraulic fluid pump and supply mechanism, and, a bypass line 336 providing fluid communication from the hydraulic control valve 280 to the hydraulic fluid return line 334, bypassing the blade motor 270.

Similarly to the embodiment of FIGS. 1-5, the hydraulic control valve 280 may include a valve plunger assembly 282 having a valve plunger 284. The valve plunger 284 is deployable at different positions in the hydraulic control valve 280 to open the hydraulic control valve 280 to various degrees and facilitate corresponding flow rates or volumes of the hydraulic fluid through the hydraulic control valve 280 to the motor-actuating line 332 and the bypass line 336. The speed control valve trigger 300 is operable by a user to adjustably press against the valve plunger 284 to vary the distribution of the hydraulic fluid supplied via the hydraulic fluid supply line 330 between the motor-actuating line 332 and the bypass line 336 to responsively adjust the speed of operation of the blade motor 270. A compression spring 286 operably engages the valve plunger 284 to bias the valve plunger 284 to an extended or non-compressed state in which the valve plunger 284 does not activate the hydraulic control valve 280 and thus hydraulic fluid flow from the hydraulic fluid supply line 330 to the motor-actuating line 332 is prevented, and the fluid is instead diverted to the bypass line 336. As with the embodiment of FIGS. 1-5, the compression spring 286 of the present embodiment is arranged sleeved over and generally coaxial with the valve plunger 284 and is configured to bias or push the valve plunger 284 upward along vertical direction z and away from the hydraulic control valve 280.

Also similarly to the previous embodiment, the handsaw 200 may include a first or rear handle 350 and a second or front handle 380, which allow an operator to easily guide and manipulate the handsaw 200 during cutting operation. In different embodiments, the rear handle 350 and/or the front handle 380 may be removable and replaceable with a corresponding, replacement rear handle 350 and/or front handle 380. For instance, in the present embodiment, similarly to the previous embodiment, both the rear handle 350 and the front handle 380 are removable.

Specifically, with reference to FIGS. 8-10, the rear handle 350 is attached to a rear handle mount bracket 352, which in turn is detachably mountable to the blade guard 204 by fasteners 354. More specifically, similarly to the previous embodiment, the rear handle mount bracket 352 includes a generally C-shaped body; however, in the present embodiment, the C-shaped body consists of a first, generally flat outer plate 356 and two transverse, parallel and spaced-apart side plates 358 extending from opposite top and bottom edges of the outer plate 356. The C-shaped, rear handle mount bracket 352 is disconnectably attachable to a second mount bracket 370, which in turn is attached to the blade guard 204, and more specifically, to an outer side of the cover panel 216 of the first blade guard portion 206 facing away from the sawblade 230. The second mount bracket 370 may be C-shaped or otherwise include two transverse, parallel and spaced-apart side plates 372. The rear handle mount bracket 352 may fit over the second mount bracket 370 such that the side plates 358 of the rear handle mount bracket 352 align with (e.g., overlap, or fit over) and preferably rest on the side plates 372 of the second mount bracket 370. As shown, the fasteners 354 may be extended through respective fastener openings 360 in the side plates 358 of the rear handle mount bracket 352 and corresponding fastener openings 374 formed in the side plates 372 of the second mount bracket 370 to secure the rear handle mount bracket 352 to the second mount bracket 370 and thereby secure the rear handle mount bracket 352 to the blade guard 204.

In turn, the front handle 380 may be removably mounted on at least one of the base 202 and the blade guard 204 in front of the blade motor 270. In the depicted embodiment, more specifically, the front handle 380 is removably mounted to both the blade guard 204 and the base 202 by respective front handle mount brackets 382. As illustrated in FIGS. 8-10, multiple fasteners 384 (e.g., bolt and nut fasteners) may be extended through respective fastener openings 386 in the front handle mount brackets 382 and extended or threaded through corresponding registering fastener openings 388 formed in the blade guard 204 (more specifically, in the cover panel 216 of the first blade guard portion 206) and the base 202. In some embodiments, the front handle 380 may be selectively mounted in different positions within the handsaw 200, i.e. relative to the base 202 and blade guard 204. For instance, the base 202 and blade guard 204 may include additional fastener openings 388 to the ones depicted herein, to allow a user to select to which subset of fastener openings 388 the front handle 380 is attached. Alternatively or additionally, the fastener openings 386 and/or 388 may be formed as elongated holes or slots which allow sliding and repositioning of the front handle 380 relative to the blade guard 204 and base 202 prior to securing the fasteners 384.

Further similarly to the embodiment of FIGS. 1-5, and with reference now to the side elevation view of FIG. 7, the hydraulic control valve 280 may control the flow of hydraulic fluid through the blade motor 270 by adjustably diving the fluid fed through the fluid supply line 330 into a first flow directed to the blade motor 270 via the motor-actuating line 332 and a second flow directed to the hydraulic fluid return line 334 via the bypass line 336. The speed control valve trigger 300 may be pivotally mounted on the rear handle mount bracket 352, and preferably below the rear handle 350, as best shown in the side elevation view of FIG. 7. The speed control valve trigger 300 is rotatable about a trigger rotation axis 302, located above the hydraulic control valve 280. The speed control valve trigger 300 may include a first trigger portion 304 and a second trigger portion 306 extending from opposite sides of an intermediate portion 308, wherein the portions 304, 306 and 308 may form a single-piece unit or a unit that is jointly rotatable about the trigger rotation axis 302. More specifically, the intermediate portion 308 may be rotatably connected to the trigger connector 362 of the rear handle mount bracket 352, such as by a shaft 364 shown in FIGS. 9 and 10, thereby defining the trigger rotation axis 302.

Also similarly to the embodiment of FIGS. 1-5, a speed control trigger bearing 310 can be rotatably attached to or carried by the second trigger portion 306 of the speed control valve trigger 300 and can be configured to rotate relative to the second trigger portion 306 about a bearing rotation axis 312 which can be parallel to the trigger rotation axis 302. The speed control valve trigger 300 may operably engage the valve plunger assembly 282 to open and close the hydraulic control valve 280 responsive to actuation of the speed control valve trigger 300; more specifically, similarly to the previous embodiment, the speed control trigger bearing 310 is configured to roll upon and axially push on an outer end of the valve plunger assembly 282 (the outer end provided, for instance, by a smooth top spring-retaining end 288 of the valve plunger assembly 282) when the user operates the first trigger portion 304 and the first and second trigger portions 304, 306 consequently rotate jointly about the trigger rotation axis 302. The axial pushing of the speed control trigger bearing 310 on the outer end or spring-retaining end 288 of the valve plunger assembly 282 causes the valve plunger 284 to advance towards or into the hydraulic control valve 280 (enabling/increasing hydraulic fluid flow) and the compression spring 286 to compress.

As with the prior embodiment, manual operation of the speed control valve trigger 300 facilitates variable positioning of the valve plunger assembly 282 in the hydraulic control valve 280 and corresponding variable flow rates of the hydraulic fluid through the hydraulic control valve 280 to the blade motor 270, and hence, variable rotational speeds of the sawblade 230. As best shown in FIG. 7, the first trigger portion 304 being arranged beneath, spaced-apart from, and generally along the rear handle 350 facilitates the user grasping the rear handle 350 from above and operating the first trigger portion 304 by pulling the first trigger portion 304 with one or more fingers upward and towards the rear handle 350. Upward pulling of the first trigger portion 304 towards the rear handle 350 causes a downward rotation of the second trigger portion 306 and the speed control trigger bearing 310 about the trigger rotation axis 302 and towards, and adjustably onto, the valve plunger 284, to operate the hydraulic control valve 280. Similarly to the previous embodiment, having the trigger rotation axis 302 above the valve plunger 284, and in near vertical alignment (i.e. only slightly offset) with a central longitudinal (vertical) axis of the valve plunger 284, as shown, allows to minimize the size of the second trigger portion 306, contributing to reduce the overall weight and increase compactness of the handsaw 200. The rear handle 350 and first trigger portion 304 being in turn positioned generally immediately rearward of the trigger rotation axis 302 further contributes to minimize size and weight of the speed control valve trigger 300 and thus of the handsaw 200.

Similarly to the embodiment of FIGS. 1-5, and with reference now to FIG. 7, the handsaw 200 may include at least one coolant discharge line 338 configured to supply a coolant fluid to the area of the sawblade 230. However, unlike the prior embodiment, the at least one coolant discharge line 338 of the present embodiment is configured to discharge the coolant fluid to one side of the sawblade 230 rather than to both sides of the sawblade 230, as will be described in greater detail hereinafter. Further similarly to the prior embodiment, the handsaw 200 of the present embodiment may include a coolant fixture or manifold 340, configured to receive a coolant fluid from a coolant fluid pump and supply mechanism through a coolant supply line 342 (which may include a coolant flow control valve 344), and to direct the coolant fluid to the coolant discharge line 338. Similarly to the previous embodiment, the coolant fixture or manifold 340, coolant supply line 342, coolant discharge line 338 and coolant flow control valve 344 are positioned at an upper portion of the blade guard 204, as illustrated, to optimize the positions of these components and eliminate or minimize interference during operation of the handsaw 200. Unlike the prior embodiment, however, the coolant fixture or manifold 340 is mounted on the rear handle mount bracket 352, as best shown in FIG. 8, and more specifically, on the top side plate 358 of the rear handle mount bracket 352. The coolant fixture or manifold 340 may be mounted to the rear handle mount bracket 352 in a fixed position, as shown, or adjustable positions, in other embodiments.

With continued reference to FIG. 8, the rear handle mount bracket 352 of the present embodiment carries not only the rear handle 350, the hydraulic control valve 280, and the speed control valve trigger 300, similarly to the previous embodiment, but also further carries the coolant fixture or manifold 340. For example, the hydraulic control valve 280 may be adhered, welded or otherwise attached or mounted to the outer plate 356 of the rear handle mount bracket 352. The rear handle 350 may be attached to the rear handle mount bracket 352 and positioned above and to the rear of the hydraulic control valve 280. The speed control valve trigger 300, as described heretofore, may be rotatably mounted to the trigger connector 362, which is in turn attached to the rear handle mount bracket 352, such as by welding or other well-known methods of attaching or integrally-forming metallic or plastic parts. In the present embodiment, the trigger connector 362 is provided at or near the top side plate 358 of the rear handle mount bracket 352. In turn, as described heretofore, the coolant fixture or manifold 340 is mounted to the top side plate 358 of the rear handle mount bracket 352.

Figure 6:
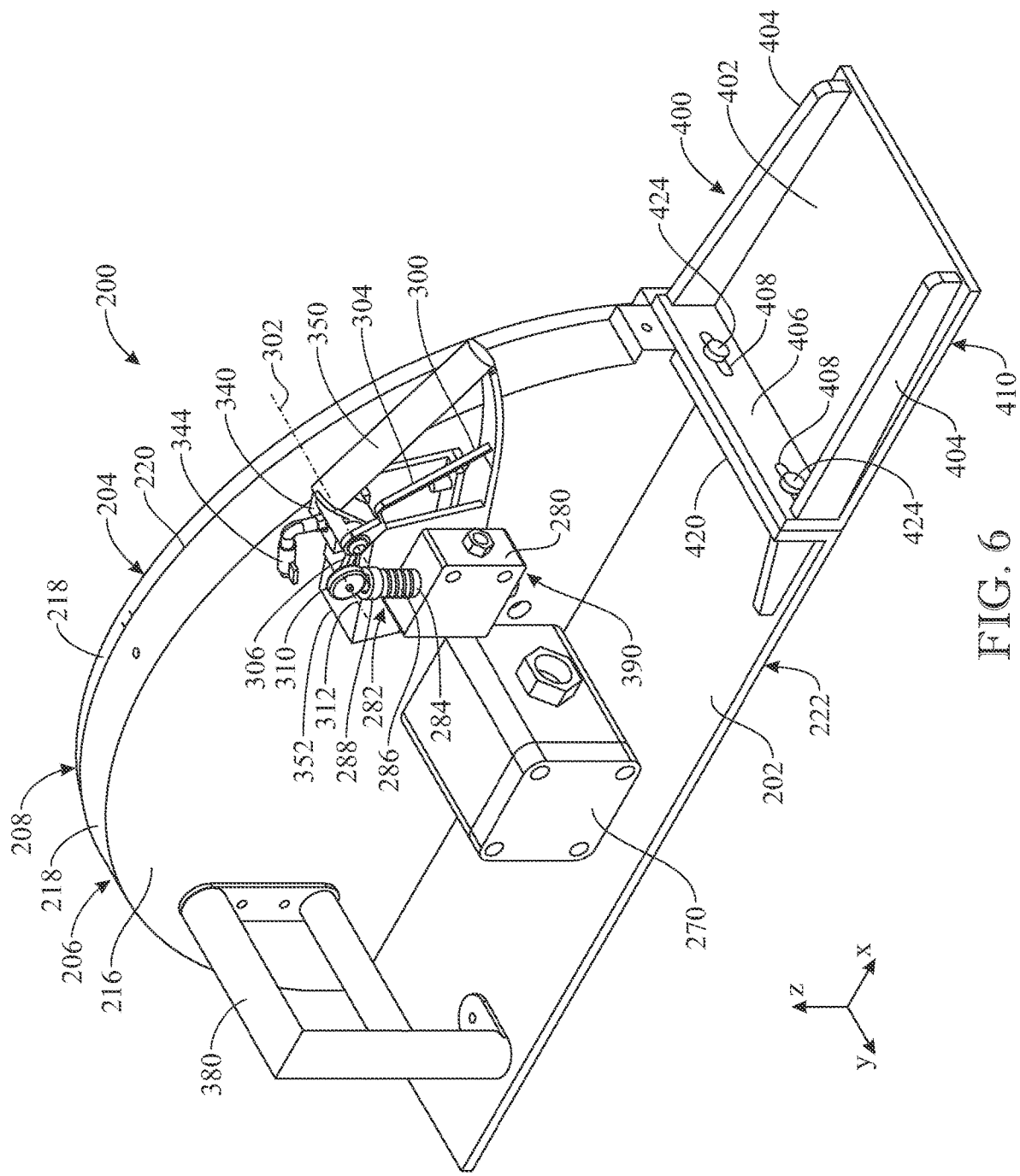
FIG. 6 presents top rear isometric view showing a handheld hydraulic-powered concrete-cutting handsaw in accordance with a second illustrative embodiment of the present invention.

Therefore, the rear handle 350, the hydraulic control valve 280, the speed control valve trigger 300, and the coolant fixture or manifold 340 of the present embodiment form a rear handle assembly 390 or unit that is jointly removable from and re-attachable to the blade guard 204 (such as to be replaced with a replacement rear handle assembly 390 in which one or more parts of the rear handle assembly 390 have been replaced). For example, the illustrations of FIGS. 6 and 8 show the rear handle assembly 390 attached and detached from the blade guard 204, respectively. In having the rear handle assembly 390 configured as a unit, the relative positioning of all four elements (rear handle 350, hydraulic control valve 280, speed control valve trigger 300 and coolant fixture or manifold 340) is maintained, facilitating a rapid disassembly and assembly of the rear handle assembly 390 with respect to the blade guard 204.

Figure 11:
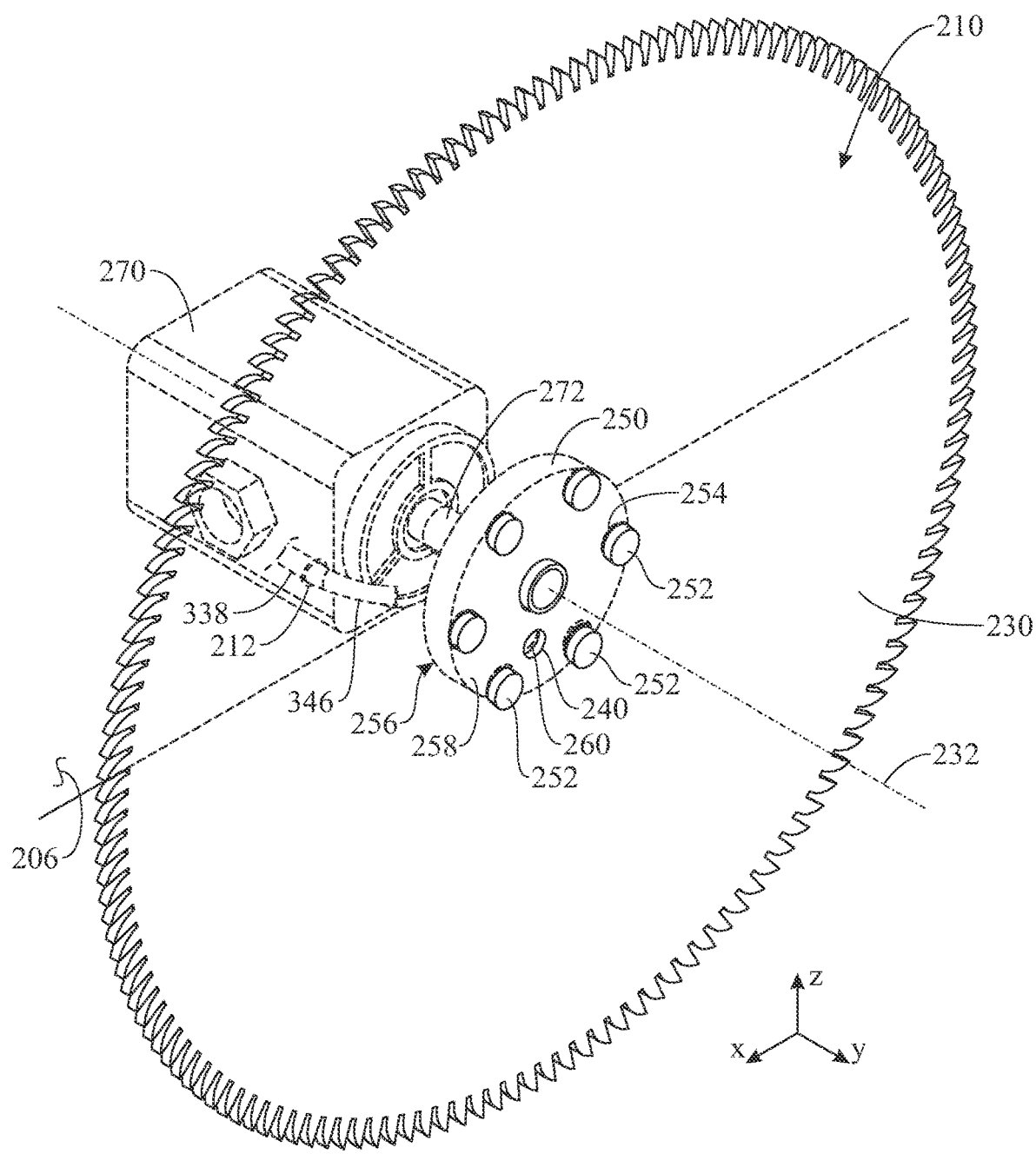
FIG. 11 presents an enlarged, top rear, right side isometric view of the sawblade, motor, blade hub and distal end of a coolant discharge line of the handsaw of FIG. 6.
Figure 12:
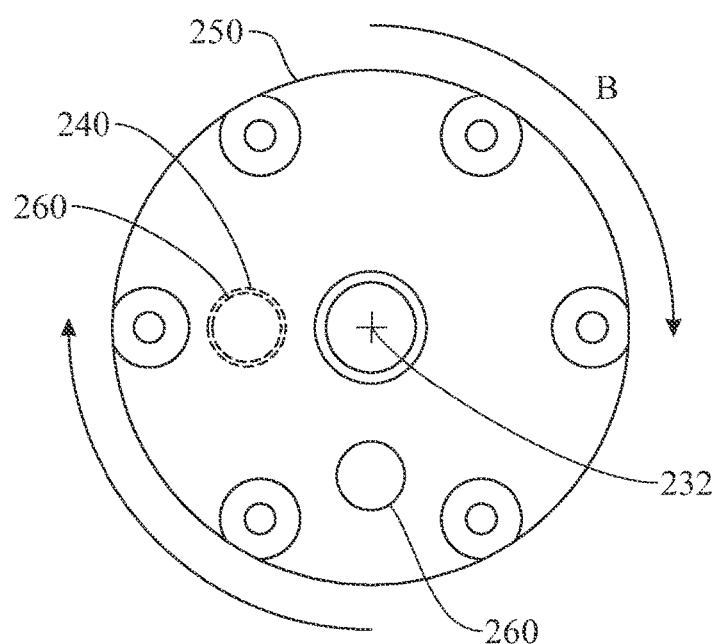
FIG. 12 presents a right side elevation view of the blade hub of FIG. 11, during operation of the handsaw.
Figure 13:
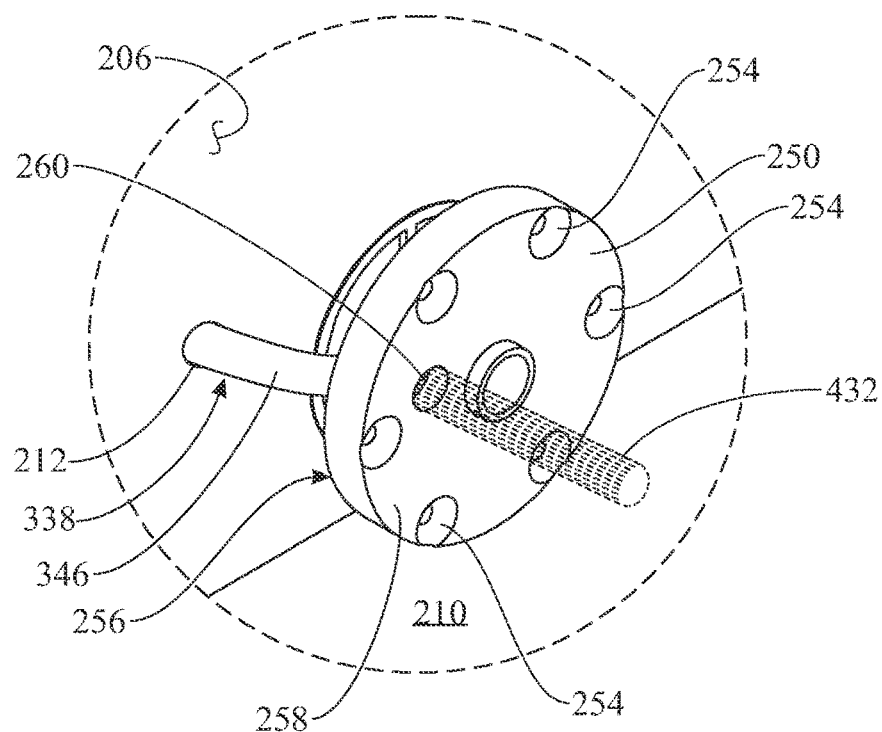
FIG. 13 presents an enlarged, top rear, right side isometric view of the distal end of the coolant discharge line of FIG. 11 discharging a coolant fluid at a first side of the blade hub, part of which is shown flowing through a fluid passageway comprised in the blade hub and being ejected outward at an opposite, second side of the blade hub.
Figure 14:
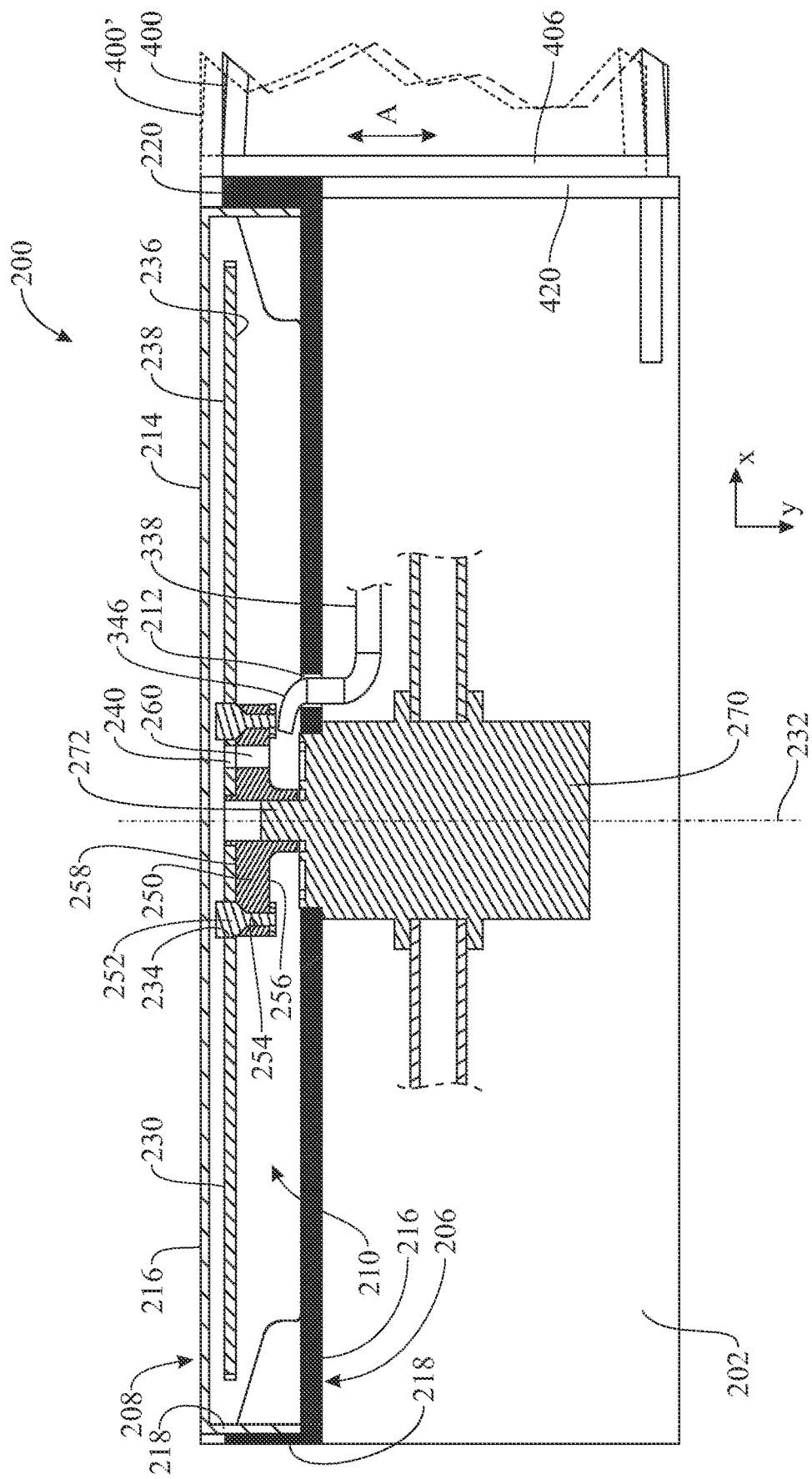
FIG. 14 presents a cross-sectional, top plan view of an area of the handsaw comprising the motor, sawblade and blade hub, the cross section taken along section plane 14-14 indicated in FIG. 7.

As shown in FIG. 7, the coolant discharge line 338 extends from the coolant fixture or manifold 340, initially along an outer side of the first blade guard portion 206 arranged opposite to the interior space 210 of the blade guard 204—i.e. the outer side of the first blade guard portion 206 at which the rear handle assembly 390 is mounted. As shown in FIGS. 7, 11, 13 and 14, the coolant discharge line 338 further extends through an opening 212 formed through the first blade guard portion 206. As best shown in FIGS. 11, 13 and 14, a distal end 346 of the coolant discharge line 338 protrudes from the opening 212 into the interior space 210, and extends to (and ends at) an area of the interior space 210 adjacent to the blade hub 250. The blade hub 250 may include one or more fluid passageways formed therethrough, providing fluid communication from a first side 256 (FIG. 9) of the blade hub 250 to an opposite, second side 258 (FIG. 10) of the blade hub 250, the first and second sides 256 and 258 facing the first and second blade guard portions 206 and 208, respectively. In some embodiments, such as the present embodiment, the fluid passageway(s) may include at least one through opening 260 formed through the blade hub 250 and providing fluid communication from the first side 256 to the second side 258 of the blade hub 250. In some embodiments, the at least one through opening 260 may be formed parallel to the blade rotation axis 232, which extends through the center of the blade hub 250. Alternatively or additionally, the at least one through opening 260 may be arranged radially outward and spaced-apart from the blade rotation axis 232. In some embodiments, and with reference to FIG. 9, the fluid passageway may include a recessed channel 262 formed into the first side 256 of the blade hub 250 and communicated with the at least one through opening 260. The recessed channel 262 may be arcuately formed and concentric with the blade hub 250 about the blade rotation axis 232. In some embodiments, such as the present embodiment, the recessed channel 262 may have an increasing depth which is greatest where the recessed channel 262 meets the at least one through opening 260, thereby promoting fluid flow from the recessed channel 262 into the through opening 260.

With reference to FIGS. 8-10, similarly to the embodiment of FIGS. 1-5, the handsaw 200 of the present embodiment includes a slurry guard 400 provided on the base 202, on a rear end of the handsaw 200 behind the blade motor 270 and longitudinally opposite to the front handle 380. In preferred embodiments, the slurry guard 400 is generally rigid or undeformable. The slurry guard 400 may include a slurry guard protecting wall 402, which may be planar (as shown) or present alternative shapes, and is configured to provide a barrier to slurry being ejected upward by the rotating sawblade 230 from below the base 202. The slurry guard 400 may further include a pair of elongated, parallel, spaced-apart slurry guard sidewalls 404 extending upward from the slurry guard protecting wall 402, and a transverse mounting wall 406 extending between the slurry guard sidewalls 404 and the slurry guard protecting wall 402 at a front end of the slurry guard protecting wall 402, similarly to the previous embodiment. The slurry guard sidewalls 404, slurry guard protecting wall 402 and transverse mounting wall 406 may form a bracket or reinforced angled structure which may extend generally longitudinally from the base 202. In preferred embodiments, a bottom side 410 of the slurry guard 400 may be arranged generally flush or coplanar with a bottom side 222 of the base 202.

The slurry guard 400 is removably mounted to the unit formed by the base 202 and the first blade guard portion 206; for example, the slurry guard 400 shown herein is specifically disconnectably attached to the base 202, similarly to the previous embodiment. The base 202 may include a slurry guard mount flange 420 provided with a plurality of fastener openings 422 (e.g., a pair of fastener openings 422). A plurality (e.g., pair) pair of slurry guard mount fasteners 424 (e.g., bolt and nut fasteners) may be extended through registering pairs of fastener openings 408, 422 in the transverse mounting wall 406 of the slurry guard 400 and the slurry guard mount flange 420 of the base 202, respectively, and may be threadingly tightened or otherwise disconnectably secured to detachably mount the slurry guard 400 on the base 202. In some embodiments, one or both of the fastener openings 408 and 422 may be transversely elongated or slot-shaped to allow for relative transverse adjustment between the slurry guard 400 and the base 202, as indicated by arrow A in FIG. 8. For instance, in the present embodiment, as best shown in FIG. 9, both the fastener openings 408 of the transverse mounting wall 406 of the slurry guard 400 and the fastener openings 422 in the slurry guard mount flange 420 of the base 202 are elongated or slot-shaped.

In an example of operation, an operator or user may operate the handsaw 200 to cut a concrete workpiece 430 in the construction of concrete structures such as such as sidewalks, walkways, parking lots and the like. Prior to operating the handsaw 200, the hydraulic fluid supply line 330 and the hydraulic fluid return line 334 may be connected to the hydraulic fluid pump and supply mechanism, and the coolant supply line 342 may be connected to the coolant fluid pump and supply mechanism, thereby providing a supply of hydraulic fluid and coolant fluid to the handsaw 200 by means which may be known in the art and are not described herein so as not to obscure the present invention.

Furthermore, as described heretofore, the blade guard 204 may be selectively configured by the operator to either include the second blade guard portion 208 or not include the second blade guard portion 208. When switching from one configuration to the other, the operator may selectively reposition the slurry guard 400 along the transverse direction y, as indicated by arrow A in FIGS. 8 and 14. More specifically, in the present embodiment, the operator may loosen the slurry guard mount fasteners 424, slide the slurry guard 400 with respect to the base 202 as indicated by arrow A to a selected position, and retighten the slurry guard mount fasteners 424 to secure the slurry guard 400 in the selected position with respect to the base 202. For example, as shown in FIG. 14, the operator may selectively adjust the slurry guard 400 in a first transverse position and a second transverse position, indicated with reference numerals 400 and 400', respectively. In the first transverse position, the slurry guard 400 may be arranged generally flush or aligned with the second side 238 of the sawblade 230. The operator may select to position the slurry guard 400 in the first transverse position, for instance, when using the handsaw 200 without the second blade guard portion 208, i.e. in flush-cut operation of the handsaw 200. In the second transverse position, which may be useful when the second blade guard portion 208 is attached to the first blade guard portion 206, the slurry guard 400' may be arranged generally flush or aligned with an outer side 214 of the second blade guard portion 208, the outer side 214 opposite to the sawblade 230.

With reference to FIG. 7, once the handsaw 200 is connected to the aforementioned fluid supplies and the slurry guard 400 is optionally mounted to the base 202 and further optionally adjusted in the transverse direction y, the bandsaw 200 may be placed on the workpiece 430, with the bottom side 222 of the base 202 resting on the workpiece 430 and, in some embodiments, the flush, bottom side 410 of the slurry guard 400 also resting on the workpiece 430 for increased stability of the handsaw 200. The operator of the handsaw 200 may grip the rear handle 350 with one hand and the front handle 380 with the other hand.

Next, the operator may actuate the speed control valve trigger 300 with the hand that is gripping the rear handle 350. As the operator actuates the speed control valve trigger 300, hydraulic fluid may flow from the hydraulic fluid pump and supply mechanism through the hydraulic fluid supply line 330, hydraulic control valve 280, motor-actuating line 332, bypass line 336, blade motor 270, hydraulic fluid return line 334 and back to the hydraulic fluid pump and supply mechanism. In consequence, the blade motor 270 may rotate the sawblade 230 about the blade rotation axis 232. The operator may simultaneously push the front and rear handles 380 and 350 frontward to displace the handsaw 200 longitudinally as indicated by arrow B in FIG. 7, and cause the sawblade 230 to cut into and along the workpiece 430. While using the handsaw 200, the operator may vary the operational speed of the blade motor 270 and rotational speed of the sawblade 230 by correspondingly varying the position of the speed control valve trigger 300 using his or her finger(s) as the speed control valve trigger 300 varies the position of the valve plunger assembly 282 in the hydraulic control valve 280 and the hydraulic control valve 280 apportions or distributes the hydraulic fluid between the motor-actuating line 332 and the bypass line 336. The speed control trigger bearing 310 may roll smoothly and easily along the valve plunger assembly 282, and more specifically, along the smooth, top spring-retaining end 288. As with the previous embodiment, said rolling of the speed control trigger bearing 310, particularly if the rolling takes place along a smooth surface, promotes an ease in pulling the speed control valve trigger 300 and smooth progression in controlling the operational speed of the blade motor 270.

As the sawblade 230 rotates and cuts the workpiece 430, similarly to the previous embodiment, the sawblade 230 is cooled by coolant fluid supplied via the coolant supply line 342, the coolant flow control valve 344, the coolant fixture or manifold 340, and the coolant discharge line 338. In the present embodiment, more specifically and with reference to FIG. 13, the distal end 346 of the coolant discharge line 338 provides the coolant fluid to the first side 256 of the blade hub 250, i.e to the area of the blade hub 250 facing the first blade guard portion 206. Part of the coolant fluid discharged by the coolant discharge line 338 remains between the first side 236 of the sawblade 230 and impacts the first side 236 of the sawblade 230. Another part of the coolant fluid discharged by the coolant discharge line 338, said another part of the coolant fluid indicated in FIG. 13 with reference numeral 432, passes through the through opening 260 of the blade hub 250 and the through opening 240 of the sawblade 230, most especially when the through openings 240, 260 are aligned. More specifically, as the blade hub 250 and sawblade 230 jointly rotate about the blade rotation axis 232 as indicated by arrow B in FIG. 12, when the through openings 240, 260 are aligned or in fluid communication with one another, as shown in broken lines in FIG. 12 and further shown in FIGS. 11 and 14, said alignment facilitates fluid flow from the first side 256 of the blade hub 250 to the second side 238 of the sawblade 230 through the aligned through openings 240, 260; said fluid flow may be further promoted by the recessed channel 262 facilitating fluid flow from the distal end 346 of the coolant discharge line 338 to the through opening 260 of the blade hub 250. In this way, in operation of the handsaw 200, coolant fluid may be discharged by the coolant discharge line 338 on one side of the blade hub 250 against the opposite, first and second sides 236 and 238 of the sawblade 230 to cool the sawblade 230, without the need for coolant discharge tubings at the second side 238 of the sawblade 230. This facilitates using the handsaw 200 without the second blade guard portion 208, such as for flush-cutting operation of the handsaw 200.

During operation of the handsaw 200, the slurry guard 400 may engage and be dragged along the concrete workpiece 430. In preferred embodiments in which the slurry guard 400 is rigid, similarly to the previous embodiment, the slurry guard 400 may function as a heel and steady the handsaw 200 during operating of the handsaw 200. In the event that the slurry guard 400 becomes damaged or wears out, the slurry guard 400 may be replaced typically by disconnecting the slurry guard mount fasteners 424, removing the worn slurry guard 400 from the base 202, and fastening a replacement slurry guard 400 to the base 202 by securing the slurry guard mount fasteners 424.

Since many modifications, variations, and changes in detail can be made to the described preferred embodiments of the invention, it is intended that all matters in the foregoing description and shown in the accompanying drawings be interpreted as illustrative and not in a limiting sense.

Furthermore, it is understood that any of the features presented in the embodiments may be integrated into any of the other embodiments unless explicitly stated otherwise. The scope of the invention should be determined by the appended claims and their legal equivalents.

What is claimed is:

1. A handheld hydraulic-powered concrete-cutting handsaw, comprising:
   a generally flat and horizontal base, formed along a generally horizontal, front-to-rear, longitudinal direction and a generally horizontal, left-to-right, transverse direction perpendicular to the longitudinal direction, the base comprising a slurry guard mount flange arranged at a rear end of the base;
   a blade guard carried by and extending upward from the base;
   a sawblade, wherein a top portion of the sawblade is covered by the blade guard and a bottom portion of the sawblade protrudes downwardly from the blade guard and the base;
   a hydraulic blade motor arranged above the base and drivingly engaging the sawblade, the blade motor operable to drive the sawblade for rotation about a blade rotation axis; and
   a slurry guard, comprising a transverse mounting wall detachably attachable to the slurry guard mount flange of the base, the slurry guard comprising a slurry guard protecting wall, the slurry guard configured to adopt an assembled configuration in which the slurry guard is detachably attached to the slurry guard mount flange of the base and the slurry guard protecting wall extends rearward of the sawblade; wherein
   the handsaw is configured to adopt a working configuration in which the slurry guard is arranged in the assembled configuration and a bottom side of the base rests on a workpiece, and further in which the sawblade is driven for rotation about the blade rotation axis by the blade motor to cut into the workpiece, the slurry guard protecting wall providing a barrier to slurry ejected upward by the bottom portion of the sawblade during said rotation of the sawblade; wherein
   the slurry guard is adjustably attachable to the slurry guard mount flange of the base along the transverse direction to selectively adjust a relative transverse position between the slurry guard and the base in the working configuration of the handsaw.

2. The handsaw of claim 1, wherein, in the assembled configuration of the slurry guard, the slurry guard is attached to and extends rearward from a rear end of the base.

3. The handsaw of claim 1, wherein the transverse mounting wall is detachably attachable to the slurry guard mount flange by a plurality of fasteners, each fastener secured to a respective first opening formed in the transverse mounting wall and a respective second opening formed in the slurry guard mount flange, wherein at least one of the respective first opening and respective second opening is elongately formed along the transverse direction.

4. The handsaw of claim 1, wherein the blade guard comprises a first blade guard portion carried by the base and a second blade guard portion disconnectably securable to the first blade guard portion such that the handsaw is selectively arrangeable in the working configuration with either:
   the second blade guard portion arranged in a mounted configuration, in which the second blade guard portion is mounted to the first blade guard portion and the first and second blade guard portions define an interior space therebetween, the interior space receiving the top portion of the sawblade, or the second blade guard portion arranged in a disassembled configuration, in which the second blade guard portion is detached from the first blade guard portion and the top portion of the sawblade is thereby exposed.

5. The handsaw of claim 4, wherein the slurry guard is adjustably attachable to the base along the transverse direction to selectively position the slurry guard generally aligned with an outer side of the second blade guard portion in the mounted configuration, the outer side of the second blade guard portion arranged opposite to the interior space and the sawblade.

6. The handsaw of claim 4, wherein the slurry guard is adjustably attachable to the base along the transverse direction to selectively position the slurry guard generally aligned with a second side of the sawblade with the second blade guard portion in the disassembled configuration, the second side of the sawblade arranged opposite to a first side of the sawblade facing the first blade guard portion.

7. The handsaw of claim 1, wherein the slurry guard is generally rigid.

8. The handsaw of claim 1, wherein, when the slurry guard is arranged in the assembled configuration, a bottom side of the slurry guard protecting wall is coplanar with the bottom side of the base.

9. The handsaw of claim 1, further comprising:
a coolant discharge line, extending through an opening formed through the blade guard such that a distal end of the coolant discharge line extends into an interior space of the blade guard at a first side of the saw blade facing the opening; and
a blade hub arranged at the first side of the sawblade, the blade hub jointly rotatable with a motor shaft of the blade motor and with the sawblade, wherein the blade hub comprises at least one fluid passageway providing fluid communication from a first side of the blade hub to a second side of the blade hub, the first and second sides facing the opening of the blade guard and the first side of the sawblade, respectively; wherein
the sawblade comprises at least one fluid passageway providing fluid communication from a first side of the sawblade facing the second side of the blade hub to an opposite, second side of the sawblade; and further wherein
in the working configuration of the handsaw, rotation of the motor shaft caused by operation of the blade motor drives the sawblade for rotation about the blade rotation axis via the blade hub, and a coolant fluid from the coolant discharge line is discharged by the distal end of the coolant discharge line at said first side of the blade hub, wherein part of the coolant fluid located at the first side of the blade hub impacts the first side of the sawblade and another part of the coolant fluid passes through the fluid passageways formed in the blade hub and the sawblade and impacts the second side of the sawblade.

10. The handsaw of claim 1, further comprising:
a mount bracket, detachably mountable to the blade guard;
a coolant fixture; and
a coolant discharge line, connected to the coolant fixture and providing fluid communication from the coolant fixture to the sawblade to cool the sawblade during rotation of the sawblade in the working configuration of the handsaw; wherein the coolant fixture is carried by the mount bracket and is detachably mountable to the blade guard via the mount bracket.

11. The handsaw of claim 10, further comprising:
a hydraulic control valve, comprising a valve plunger assembly including a compressible and expandable valve plunger, the hydraulic control valve configured to regulate a flow of hydraulic fluid to the blade motor responsively to an adjustable compression of the valve plunger, wherein
the hydraulic control valve is carried by the mount bracket and is detachably mountable to the blade guard via the mount bracket.

12. The handsaw of claim 11, further comprising:
a speed control valve trigger, operable to adjustably compress the valve plunger; wherein
the speed control valve trigger is carried by the mount bracket and is detachably mountable to the blade guard via the mount bracket.

13. The handsaw of claim 10, further comprising a rear handle, carried by the mount bracket and detachably mountable to the blade guard via the mount bracket.

14. The handsaw of claim 1, further comprising a front handle arranged above the base, frontward of the blade motor and the slurry guard.

15. The handsaw of claim 1, wherein the sawblade is arranged along a generally longitudinal and vertical plane, perpendicular to the base, and the blade rotation axis is arranged along the transverse direction.

16. A handheld hydraulic-powered concrete-cutting handsaw, comprising:
a generally flat and horizontal base, formed along a generally horizontal, front-to-rear, longitudinal direction and a generally horizontal, left-to-right, transverse direction perpendicular to the longitudinal direction;
a blade guard carried by and extending upward from the base, the blade guard comprising a first blade guard portion carried by the base and a second blade guard portion disconnectably securable to the first blade guard portion;
a sawblade, wherein a top portion of the sawblade is covered by the blade guard and a bottom portion of the sawblade protrudes downwardly from the blade guard and the base;
a hydraulic blade motor arranged above the base and drivingly engaging the sawblade, the blade motor operable to drive the sawblade for rotation about a blade rotation axis; and
a slurry guard, detachably attachable to the base, the slurry guard comprising a slurry guard protecting wall, the slurry guard configured to adopt an assembled configuration in which the slurry guard is detachably attached to the base and the slurry guard protecting wall extends rearward of the sawblade; wherein
the handsaw is configured to adopt a working configuration in which the slurry guard is arranged in the assembled configuration and a bottom side of the base rests on a workpiece, and further in which the sawblade is driven for rotation about the blade rotation axis by the blade motor to cut into the workpiece, the slurry guard protecting wall providing a barrier to slurry ejected upward by the bottom portion of the sawblade during said rotation of the sawblade; wherein
the handsaw is selectively arrangeable in the working configuration with either:
the second blade guard portion arranged in a mounted configuration, in which the second blade guard portion is mounted to the first blade guard portion and the first and second blade guard portions define an interior space therebetween, the interior space receiving the top portion of the blade guard, or the second blade guard portion arranged in a disassembled configuration, in which the second blade guard portion is detached from the first blade guard portion and the top portion of the sawblade is thereby exposed; and further wherein the slurry guard is adjustably attachable to the base along the transverse direction to selectively adjust a relative transverse position between the slurry guard and the base in the working configuration of the handsaw, and to selectively position the slurry guard generally aligned with an outer side of the second blade guard portion in the mounted configuration, the outer side of the second blade guard portion arranged opposite to the interior space and the sawblade.

17. A handheld hydraulic-powered concrete-cutting bandsaw, comprising:

a generally flat and horizontal base, formed along a generally horizontal, front-to-rear, longitudinal direction and a generally horizontal, left-to-right, transverse direction perpendicular to the longitudinal direction;

a blade guard carried by and extending upward from the base, the blade guard comprising a first blade guard portion carried by the base and a second blade guard portion disconnectably securable to the first blade guard portion;

a sawblade, wherein a top portion of the sawblade is covered by the blade guard and a bottom portion of the sawblade protrudes downwardly from the blade guard and the base;

a hydraulic blade motor arranged above the base and drivingly engaging the sawblade, the blade motor operable to drive the sawblade for rotation about a blade rotation axis; and a slurry guard, detachably attachable to the base, the slurry guard comprising a slurry guard protecting wall, the slurry guard configured to adopt an assembled configuration in which the slurry guard is detachably attached to the base and the slurry guard protecting wall extends rearward of the sawblade; wherein the handsaw is configured to adopt a working configuration in which the slurry guard is arranged in the assembled configuration and a bottom side of the base rests on a workpiece, and further in which the sawblade is driven for rotation about the blade rotation axis by the blade motor to cut into the workpiece, the slurry guard protecting wall providing a barrier to slurry ejected upward by the bottom portion of the sawblade during said rotation of the sawblade; wherein the handsaw is selectively arrangeable in the working configuration with either:

the second blade guard portion arranged in a mounted configuration, in which the second blade guard portion is mounted to the first blade guard portion and the first and second blade guard portions define an interior space therebetween, the interior space receiving the top portion of the blade guard, or the second blade guard portion arranged in a disassembled configuration, in which the second blade guard portion is detached from the first blade guard portion and the top portion of the sawblade is thereby exposed; and further wherein the slurry guard is adjustably attachable to the base along the transverse direction to selectively adjust a relative transverse position between the slurry guard and the base in the working configuration of the handsaw, and to selectively position the slurry guard generally aligned with a second side of the sawblade with the second blade guard portion in the disassembled configuration, the second side of the sawblade arranged opposite to a first side of the sawblade facing the first blade guard portion.

18. A handheld hydraulic-powered concrete-cutting handsaw, comprising:

a generally flat and horizontal base, formed along a generally horizontal, front-to-rear, longitudinal direction and a generally horizontal, left-to-right, transverse direction perpendicular to the longitudinal direction;

a blade guard carried by and extending upward from the base;

a sawblade, wherein a top portion of the sawblade is covered by the blade guard and a bottom portion of the sawblade protrudes downwardly from the blade guard and the base;

a hydraulic blade motor arranged above the base and drivingly engaging the sawblade, the blade motor operable to drive the sawblade for rotation about a blade rotation axis;

a slurry guard, detachably attachable to the base, the slurry guard comprising a slurry guard protecting wall, the slurry guard configured to adopt an assembled configuration in which the slurry guard is detachably attached to the base and the slurry guard protecting wall extends rearward of the sawblade;

a coolant discharge line, extending through an opening formed through the blade guard such that a distal end of the coolant discharge line extends into an interior space of the blade guard at a first side of the saw blade facing the opening; and a blade hub arranged at the first side of the sawblade, the blade hub jointly rotatable with a motor shaft of the blade motor and with the sawblade, wherein the blade hub comprises at least one fluid passageway providing fluid communication from a first side of the blade hub to a second side of the blade hub, the first and second sides facing the opening of the blade guard and the first side of the sawblade, respectively; wherein the sawblade comprises at least one fluid passageway providing fluid communication from a first side of the sawblade facing the second side of the blade hub to an opposite, second side of the sawblade; and further wherein the handsaw is configured to adopt a working configuration in which:

the slurry guard is arranged in the assembled configuration, a bottom side of the base rests on a workpiece, the sawblade is driven for rotation about the blade rotation axis by the blade motor via the blade hub to cut into the workpiece, the slurry guard protecting wall provides a barrier to slurry ejected upward by the bottom portion of the sawblade during said rotation of the sawblade, and a coolant fluid from the coolant discharge line is discharged by the distal end of the coolant discharge line at said first side of the blade hub, wherein part of the coolant fluid located at the first side of the blade hub impacts the first side of the sawblade and another part of the coolant fluid passes through the fluid passageways formed in the blade hub and the sawblade and impacts the second side of the sawblade.

19. A handheld hydraulic-powered concrete-cutting handsaw, comprising:
- a generally flat and horizontal base, formed along a generally horizontal, front-to-rear, longitudinal direction and a generally horizontal, left-to-right, transverse direction perpendicular to the longitudinal direction;
- a blade guard carried by and extending upward from the base;
- a sawblade, wherein a top portion of the sawblade is covered by the blade guard and a bottom portion of the sawblade protrudes downwardly from the blade guard and the base;
- a hydraulic blade motor arranged above the base and drivingly engaging the sawblade, the blade motor operable to drive the sawblade for rotation about a blade rotation axis;
- a slurry guard, detachably attachable to the base, the slurry guard comprising a slurry guard protecting wall, the slurry guard configured to adopt an assembled configuration in which the slurry guard is detachably attached to the base and the slurry guard protecting wall extends rearward of the sawblade;
- a mount bracket, detachably mountable to the blade guard;
- a coolant fixture;
- a coolant discharge line, connected to the coolant fixture;
- a hydraulic control valve, comprising a valve plunger assembly including a compressible and expandable valve plunger, the hydraulic control valve configured to regulate a flow of hydraulic fluid to the blade motor responsively to an adjustable compression of the valve plunger; and
- a speed control valve trigger, operable to adjustably compress the valve plunger; wherein the coolant fixture, the hydraulic control valve and the speed control valve trigger are carried by the mount bracket and is detachably mountable to the blade guard via the mount bracket; and further wherein the handsaw is configured to adopt a working configuration in which the slurry guard is arranged in the assembled configuration and a bottom side of the base rests on a workpiece, and further in which the sawblade is driven for rotation about the blade rotation axis by the blade motor to cut into the workpiece, the slurry guard protecting wall providing a barrier to slurry ejected upward by the bottom portion of the sawblade during said rotation of the sawblade, and further in which the coolant discharge line provides fluid communication from the coolant fixture to the sawblade to cool the sawblade during rotation of the sawblade.

20. The handsaw of claim 19, further comprising a rear handle, carried by the mount bracket and detachably mountable to the blade guard via the mount bracket.

* * * * *